United States Patent
Yamamoto

[19]

[11] Patent Number: 5,930,014
[45] Date of Patent: Jul. 27, 1999

[54] NETWORK SYSTEM HAVING NODE DEVICES CONNECTED THEREBETWEEN, NODE DEVICE USED IN THE NETWORK SYSTEM, AND COMMUNICATION METHOD UTILIZED IN THE NETWORK SYSTEM

[75] Inventor: Mitsuru Yamamoto, Yokohama, Japan

[73] Assignee: Canon Kabushiki Kaisha, Tokyo, Japan

[21] Appl. No.: 08/772,121

[22] Filed: Dec. 20, 1996

[30] Foreign Application Priority Data

Dec. 21, 1995 [JP] Japan ..................................... 7-333230
Dec. 13, 1996 [JP] Japan ..................................... 8-333629

[51] Int. Cl.⁶ .................................................. H04B 10/20

[52] U.S. Cl. ........................................... 359/118; 359/124

[58] Field of Search .................................... 359/118, 124, 359/165, 125, 128

[56] References Cited

U.S. PATENT DOCUMENTS

| | | | |
|---|---|---|---|
| 4,516,272 | 5/1985 | Yano | 359/136 |
| 5,319,485 | 6/1994 | Yasui et al. | 359/124 X |
| 5,699,177 | 12/1997 | Yamamoto | 359/124 X |
| 5,801,859 | 9/1998 | Yamamoto | 359/119 |

*Primary Examiner*—Thomas Mullen
*Attorney, Agent, or Firm*—Fitzpatrick, Cella, Harper & Scinto

[57] ABSTRACT

A node device is constructed such that the number of relayings can be reduced where communication is performed between terminal equipments connected to this node device. A signal from the terminal equipment is stored in a buffer of the node device. A part of output channels of a connection unit for selecting the output channel of the buffer is guided to a separation unit of this node device. The separation unit separates a signal, which is to be output to the terminal equipment connected to this separation unit, and sends the separated signal to this terminal equipment.

38 Claims, 22 Drawing Sheets

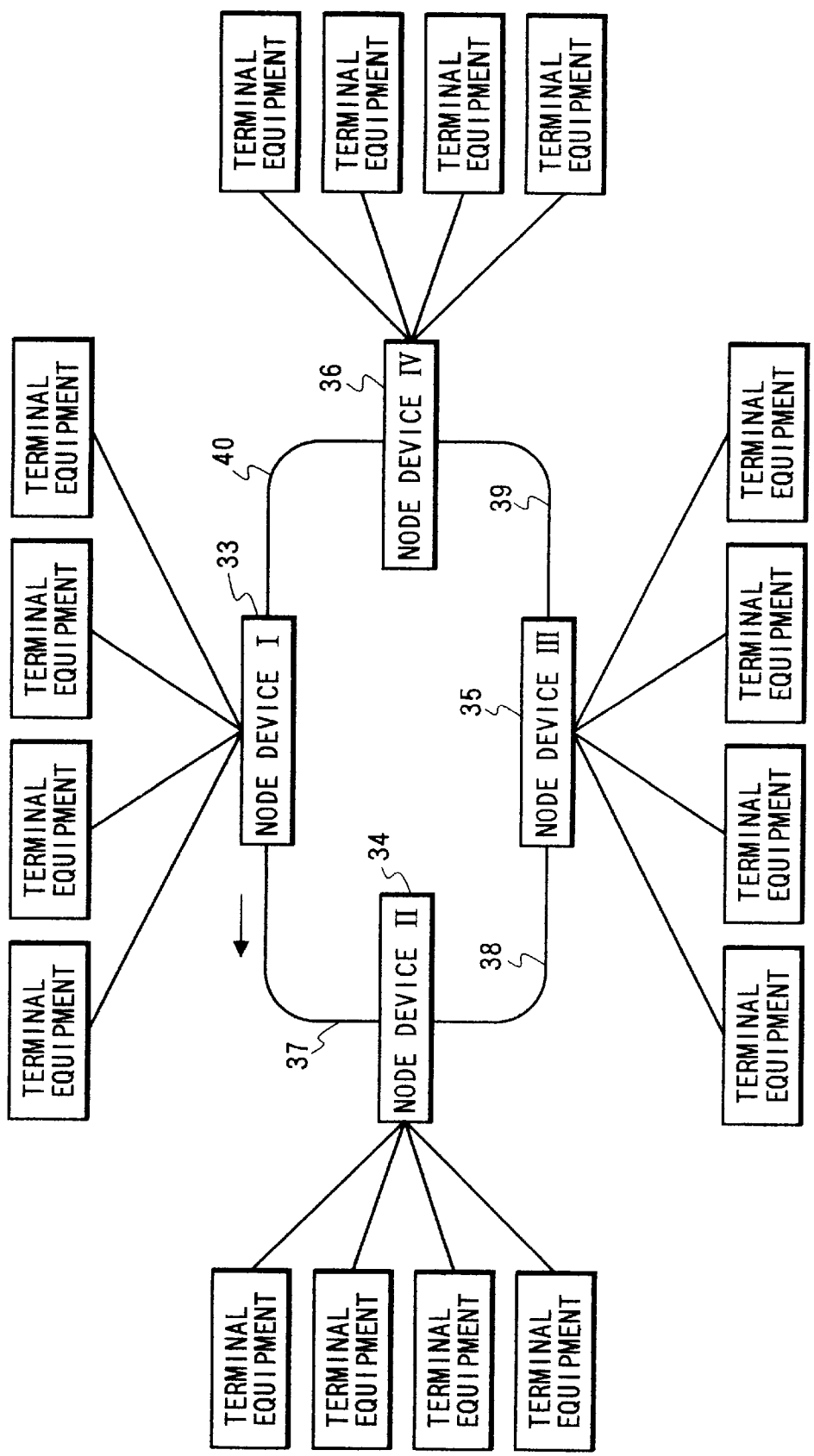

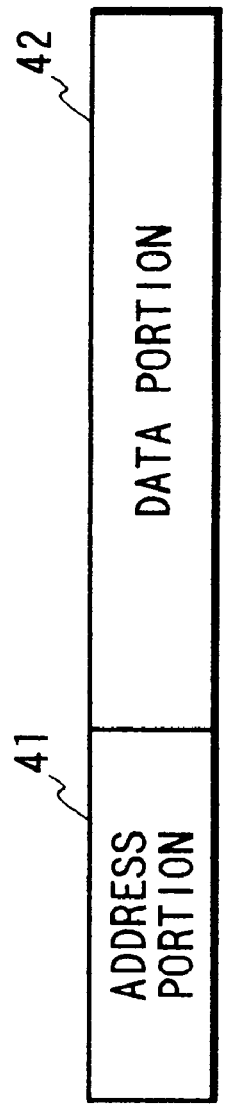
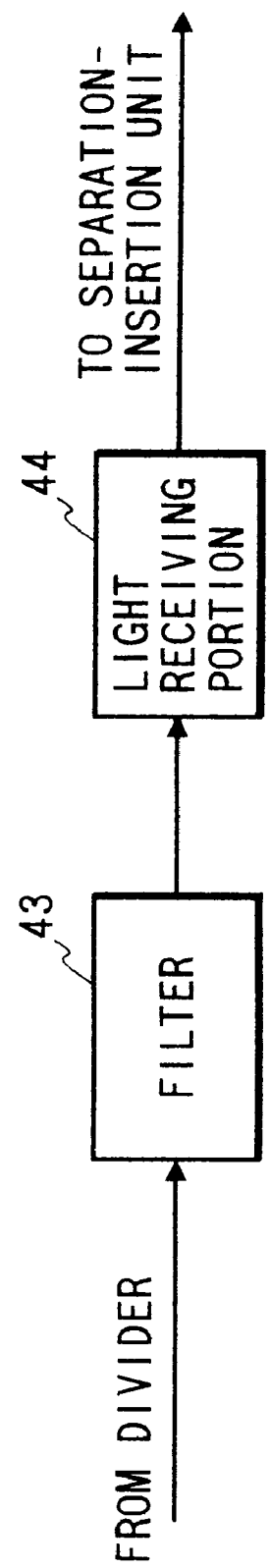

FUNCTION OF SWITCH — STRAIGHT, CROSS

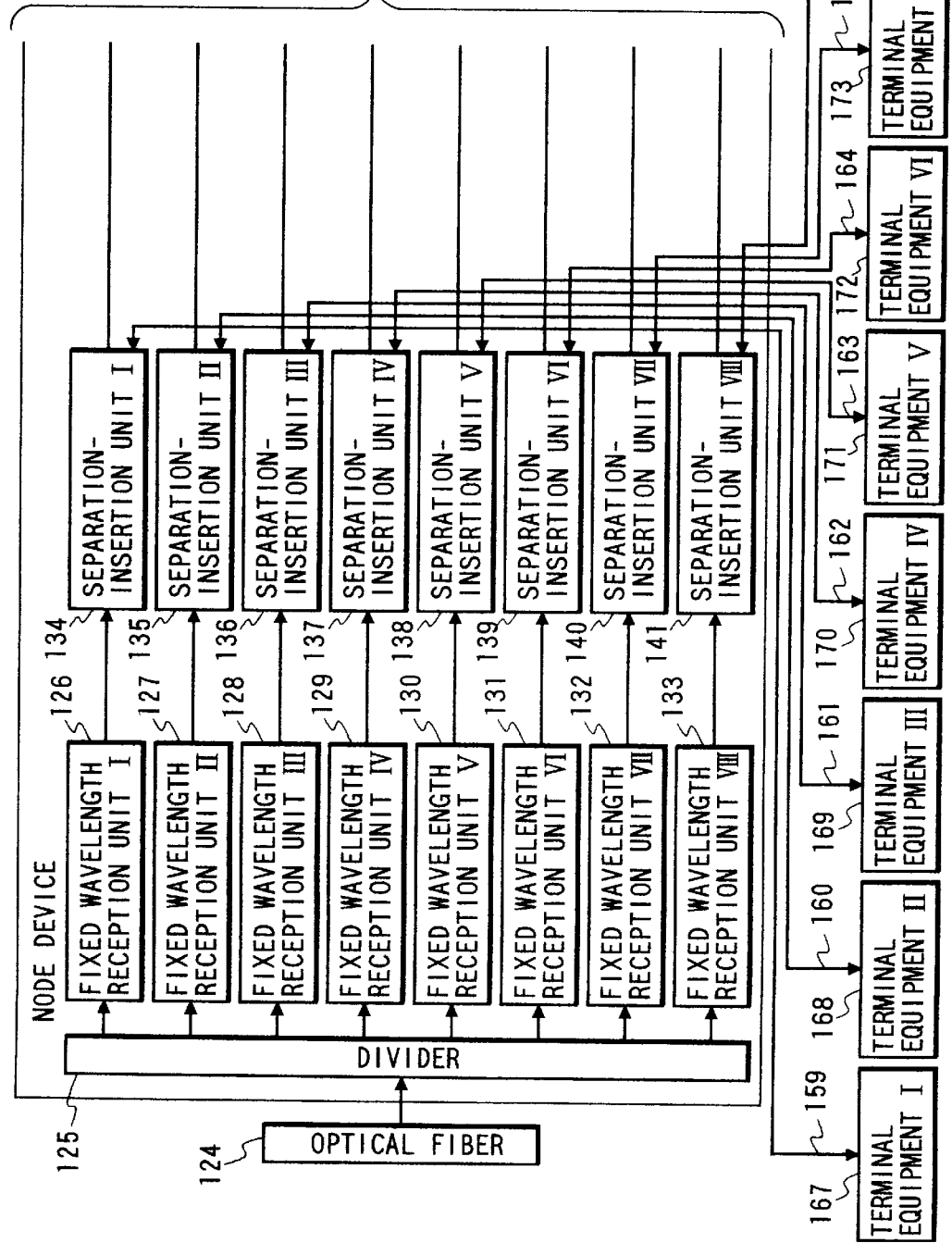

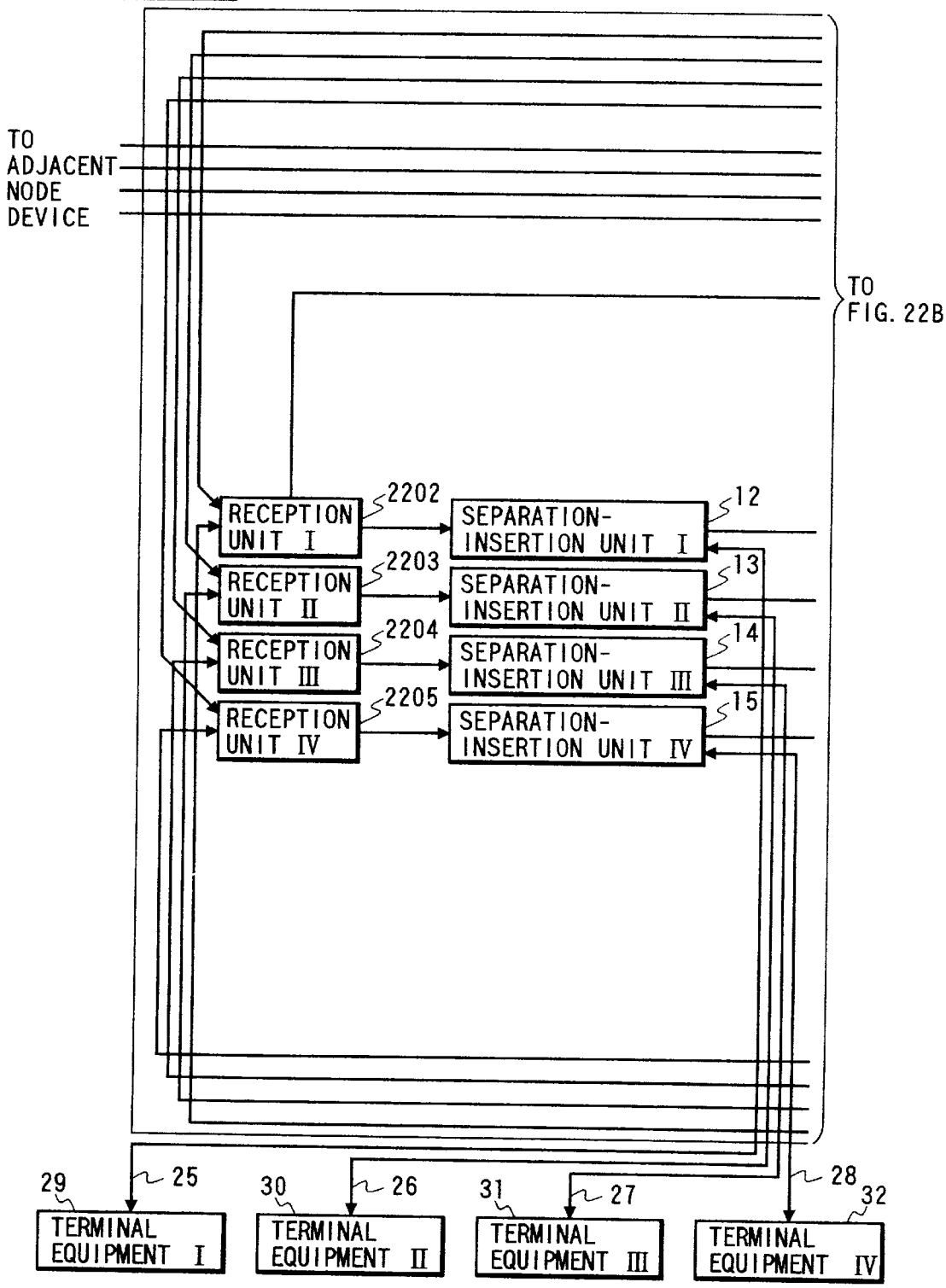

NETWORK SYSTEM HAVING NODE DEVICES CONNECTED THEREBETWEEN, NODE DEVICE USED IN THE NETWORK SYSTEM, AND COMMUNICATION METHOD UTILIZED IN THE NETWORK SYSTEM

BACKGROUND OF THE INVENTION

1. Field of the Invention

The present invention generally relates to a network system, a node device and a communication method. More particularly, the present invention relates to a node device for connection of at least a piece or unit of equipment terminal equipment, a network system which includes a channel (for example, optical wavelength) division multiplexed transmission line for connection of a plurality of the node devices, and a communication method for transmitting a packet through the node devices in the network system.

2. Related Background Art

In recent years, study and development have been made with respect to network systems each of which employs a plurality of channels for transmission, such as an optical wavelength multiplexed transmission line utilizing a wide range of optical wavelengths, since a high-speed and large-capacity network system, which includes terminal equipments connected to a plurality of node devices, is required, following an increase in speed of processing in each terminal equipment. Such network systems, node devices and communication methods are roughly classified into two types.

A first classification, as shown in FIG. 14, includes a network system which is composed of a plurality of node devices 89 for connection of a plurality of terminals 95 and 96 and an optical wavelength multiplexed transmission line 97 which involves plural wavelength channels and performs information transmission and reception by connecting the plurality of node devices 89.

In the first type of the network system of FIG. 14, a packet transmitted from the terminal equipment 95 and input to an input I/F unit 93 is wavelength-exchanged in an exchange unit 91 so as to be transmitted from one of a plurality of fixed wavelength transmission units 92 at a predetermined wavelength.

The packet is then output to the fixed wavelength transmission unit 92 and transmitted at the predetermined wavelength therefrom. Afterward, relay processings are made through relaying node devices which exist on the way to the node device connected to a destination terminal equipment to which the packet is addressed. In the relaying node device, the packet is wavelength-exchanged in the exchange unit 91 which exchanges the input wavelength of the packet by detecting the address of the packet.

Finally, the packet is received at a fixed wavelength reception unit 90 in the destination node device, the address of the packet is detected in the exchange unit 91 and the output destination of the packet is controlled by the exchange unit 91 so as to be output from an output I/F unit 94 to which the destination terminal equipment is connected. Accordingly, the packet is output from the proper output I/F unit 94 and received by the destination terminal equipment 96.

The exchange unit 91 of the node device is operative to route the packet to a desired terminal equipment connected to a desired node device, by controlling the exchange operation which selects an output port of the input packet from the fixed wavelength transmission units 92 and output I/F units 94.

A second classification includes a network system connected by a topological optical wavelength multiplexed transmission line, such as bus and star networks, which is generally called a transmission media shared-type system.

In such a network system, when each terminal equipment starts the transmission of a packet, the terminal equipment makes a request for use of the wavelength multiplexed transmission line to a server which manages the wavelength assigned to each of the terminal equipments. The terminal equipment is then assigned a usable wavelength from the server. This is a so-called demand assign method. The network system thus performs arbitration control, using the demand assign method, so as not to cause a wavelength conflictive or collision situation in which plural terminal equipments intend to use the same wavelength for transmission of the packet. As discussed above, in the network system of the second type, the transmission of a packet is executed by using the thus-assigned wavelength.

The above conventional systems, however, have some disadvantages as described below.

In the first type of conventional system, there arises a problem that cost of the node device increases because of a large-scale hardware of the exchange unit.

FIG. 15 is a first structural example of the conventional exchange unit 91 of the first type, illustrating a crossbar-type exchange unit which has N input terminals and N output terminals.

In FIG. 15, each of decoder units 98 reads the address portion of an input packet and instructs a control unit 102 on the output destination to which the packet should be output. At the same time, the decoder unit 98 sends out the packet to a next stage. FIFOs (First In First Out) 99 then store the input packets temporarily and output them to respective output lines one by one, in order of input, under the control of the control unit 102.

Input lines 100 supply switches 101 with the packet signals from the FIFOs 99. The switches 101 act as a switch-over as to whether to output the input packet signal to an output line 103 or not. The control unit 102 performs, in accordance with outputs from the decoders, read-out control of the FIFOs 99 as well as opening and closing control of the respective switches 101.

The output lines 103 supply the respective output destinations with the packet signals output from the respective switches 101.

FIG. 18 shows a packet to be exchanged in the packet exchange unit 91. In FIG. 18, an address portion 112 indicates a destination terminal equipment to which the packet is addressed, and a data portion 113 indicates data to be carried by the packet.

In the crossbar exchange apparatus, routing control is performed in the control unit 102 by controlling opening and closing action of the switch to which a desired destination is connected, so that the output destination can be changed. Arbitration control is also performed in the control unit 102 to determine which of plural inputs should be output, when a so-called output conflict occurs. In the output conflict, the plural inputs are intended to be output to the same output destination.

Under those controls, the exchange operation is carried out in the crossbar exchange. However, in the first example of the exchange unit 91 having N inputs and N outputs, N×N switches are needed, resulting in a very large-scale hardware.

Further, the first example of the exchange unit is required to connect to the same output line 103 N switch outputs of the switches 101, which connect between the plurality of input lines 100 and the plurality of output lines 103, so that wiring of the connection line will be prolonged, resulting in delay due to the long wiring, an increase in stray capacitance of the wiring, and the like. Accordingly, as the number of N inputs increases, it becomes harder to accelerate switching operation of the switch 101. In other words, the first type of the exchange unit is unsuitable for a high-speed exchange of input packet signals.

Furthermore, the first example of the exchange unit 91 is required to perform the arbitration control for each output destination by monitoring occurrence of the output conflict with respect to all the inputs. This also leads to an increase in the hardware scale of the control unit which needs to perform the above-discussed arbitration control.

Now, FIG. 16 shows a second structural example of the exchange unit 91, which is intended to overcome the problems in the first example of the exchange unit 91. This second type of the exchange unit 91 is constructed in a manner that 2×2 switches having two inputs and two outputs are connected in a multi-stage form. In FIG. 16, each of switches 104 is a 2×2 switch having two inputs and two outputs and performs both of functions; straight and cross. In the straight function, inputs are connected straight to outputs, while in the cross function inputs are connected crosswise to outputs. A set of 2×2 switches containing 12 pieces and connected to form a shuffle network constitutes an omega-type exchange unit having eight inputs and eight outputs.

FIG. 17 shows the internal structure of the 2×2 switch 104 having two inputs and two outputs as mentioned above.

In FIG. 17, a decoder I 105 and a decoder II 106 each read the address portion of an input packet and instruct the control unit on a corresponding output terminal to which the packet should be output. A FIFO (First In First Out) I 107 and a FIFO II 108 temporarily store the input packets and output them to selectors, in order of input, under the control of a control unit 111. The selector I 109 and the selector II 110 each select either of the FIFOs 107 and 108, which stores the packet signal to be output to the output destination, under the control of the control unit 111.

When the selector I 109 selects the FIFO I 107 and the selector II 110 selects the FIFO II 108, the switch is functionally in the straight state. Conversely, if the selector I 109 selects the FIFO II 108 and the selector II 110 selects the FIFO I 107, the switch is in the cross state.

In the second example of the exchange unit 91, the required number of the 2×2 switches 104 is NlogN-N/2 (the base of the log is 2), so that it can be smaller than that of the first example which includes the N×N switches. Nonetheless, there also arises another problem that the whole of the hardware becomes large because the 2×2 switches each require decoders, FIFOs, a control unit and selectors.

Further, the second example of the exchange unit 91 has the disadvantage that a so-called blocking phenomenon is likely to occur. In the blocking phenomenon, connection with a desired output destination can not be made, depending upon connection conditions of the other inputs, even if the connection has not been made from different inputs to a common output destination.

In FIG. 16, assuming that the input 5 is connected to the output destination 3, the 2×2 switch 104 on an upper left side will be set to the cross state. Under this condition, however, the input 1 can not be connected to the output destination 1 because the upper left 2×2 switch 104 needs to be set to the straight state, and thus, the blocking occurs.

As described in the foregoing, the first type of the conventional network system has the disadvantage that the node device increases in cost because of a large-scale hardware of the exchange unit which forms a main component of the node device.

On the other hand, the second type of the network system is typically constructed as shown in FIG. 19, with the following problems contained therein.

FIG. 19 shows an example of the second type of the conventional network system, which is constructed in a form in which a plurality of terminal equipments are connected through a bus-type network to a server which performs the usable wavelength assignment for each terminal equipment.

In FIG. 19, a bus-type wavelength multiplexed transmission line 114 is an optical fiber cable. A server 115 has a wavelength assignment function. Blocks 116 each indicate a terminal equipment. A power multiplexer and divider 117 guides an optical signal from a variable wavelength transmission unit 118 to the optical fiber 114 and branches an optical signal transmitted on the optical fiber 114 to supply the branched one to a fixed wavelength reception unit 119.

The variable wavelength transmission unit 118 contains a tunable laser diode (TLD) therein and is operative to convert a packet signal from a packet processing unit 120 into an optical signal having a predetermined wavelength under the control of a wavelength control unit 121 and supply it to the power multiplexer and divider 117. The fixed wavelength reception unit 119 is comprised of a filter, through which only an optical signal having a predetermined wavelength can be transmitted by cutting off signals at the other wavelengths, and a photodiode which is operative to convert the optical signal at the predetermined wavelength transmitted through the filter into an electric signal and output the electric signal therefrom.

The wavelengths to be transmitted through the filters of the fixed wavelength reception units 119 are assigned to the respective terminal equipments such that those assigned wavelengths are different among the terminal equipments. The wavelength control unit 121 controls the transmission wavelength from the variable wavelength transmission unit 118 to a desired wavelength. Finally, an assignment control unit 122 assigns a plurality of usable wavelengths to the respective terminal equipments in the network system and performs the arbitration control such that the wavelength conflict does not occur.

The conventional network system, as described above, necessarily has the arbitration function, by which the overlap of wavelengths in use of the respective variable wavelength transmission units 118 in the plural terminal equipments can be prevented, because the optical fiber 114, which is the bus-type wavelength multiplexed transmission line, is commonly used by the respective terminal equipments 116. Generally, a demand assign method is used to perform the arbitration control.

In this method, when transmitting a packet, the transmitting terminal equipment 116 first sets the transmission wavelength of its variable wavelength transmission unit 118 to an fixed wavelength acceptable to the server and sends the server a transmission request packet which clearly designates an address of a destination terminal.

On reception of the transmission request packet, the server 115 looks into whether an acceptable wavelength to the destination terminal equipment is available or not. The server then sets the transmission wavelength of its variable wavelength transmission unit 118 to an acceptable wavelength to the transmitting terminal equipment, which has sent the transmission request packet, and sends the transmitting terminal equipment a communication permission packet if available, or a communication non-permission packet if unavailable.

After the terminal equipment, from which the transmission request packet has been sent, receives either of the communication permission/non-permission packets, the transmitting terminal equipment sets the transmission wavelength of its variable wavelength transmission unit 118 to the acceptable wavelength to the addressed terminal equipment and transmits a desired packet, if the communication is found permissive. If not permissive, the transmitting terminal equipment waits for a predetermined interval of time, and re-sends the server the transmission request packet. This operation is repeated until the communication is permitted. The arbitration function is thus performed such that the overlap of transmission wavelengths from the respective variable wavelength transmission units of the plurality of terminal equipments can be prevented.

In the conventional network system of the second type, the filters in the respective terminal equipments are set to transmit therethrough only optical signals having different wavelengths, respectively, so that the wavelength of the optical signal incident on each photodiode can be specific as well. Accordingly, the transmission wavelength is changed at the tunable laser diode (TLD) of the transmitting terminal equipment, thereby realizing the routing function for sending a packet to a desired destination terminal equipment.

However, in the network system of the second type, it takes much time to conduct communications with the server for the arbitration, such as a transmission of the transmission request packet and a reception of the communication permission/non-permission packets.

Further, the arbitration control needs to be performed in the server, for all the wavelengths to be used on the network, and this puts too much load on the arbitration control unit of the server, so that arbitration itself takes much time, resulting in lowering of throughput in the network system. Furthermore, the wavelength control unit of each terminal equipment needs to adjust the transmission wavelength to a predetermined wavelength each time communication is conducted with the server and with the addressed receiving terminal equipment. This requires high-speed wavelength control, resulting in a large-scale hardware.

Considering the problems of the above-discussed conventional networks, the inventor of the present invention already made inventions on a node device and a network system as illustrated in FIGS. 20A and 20B, and filed the U.S. Patent application thereon with the U.S. Patent and Trademark Office on Dec. 28, 1995 (now U.S. Pat. No. 5,801,859).

In FIGS. 20A and 20B, a control unit 123 of the node device includes a buffer control unit for controlling the read-out of buffers and a wavelength control unit for controlling the transmission wavelengths of variable wavelength transmission units. An optical fiber 124 is used as an optical wavelength multiplexed transmission line. A power divider 125 divides an optical signal transmitted on the optical fiber 124 into eight portions and output them to eight fixed wavelength reception units.

The fixed wavelength reception units I 126 to VIII 133 are photodiodes and serve as fixed wavelength reception means. The fixed wavelength reception units I 126 to VIII 133 each receive only a packet which is transmitted as one of optical signals having wavelengths $\lambda 1$ to $\lambda 8$.

Separation-insertion units I 134 to VIII 141 serve as separation-insertion means, each of which is operative to separate a packet, which is to be transmitted to a sub-transmission line, out of a packet stream from each of the fixed wavelength reception units 126 to 133 and transmit it to the sub-transmission line, while it is operative to add a packet from the sub-transmission line to the packet stream from the fixed wavelength reception unit.

Buffers I 142 to VIII 149 serve as buffer means to temporarily store the packets from the separation-insertion units. Variable wavelength transmission units I 150 to VIII 157 are variable wavelength transmission means, which convert, under the control of the wavelength control unit, the packets from the buffers 142 to 149 into optical signals each having a predetermined wavelength out of wavelengths $\lambda 1$ to $\lambda 8$ and send them through a wavelength multiplexer 158 to the optical fiber 124.

The wavelength multiplexer 158 multiplexes the optical signals of wavelengths $\lambda 1$ to $\lambda 8$ which are sent from the eight variable wavelength transmission units 150 to 157, and supplies them to the optical fiber 124.

Sub-transmission lines I 159 to VIII 166 serve as packet transmission lines between the separation-insertion units 134 to 141 and terminal equipments I 167 to VIII 174. The terminal equipments I 167 to VIII 174 are connected to the sub-transmission lines I 159 to VIII 166, respectively. Each of the terminal equipments receives a packet output from each of the corresponding separation-insertion units 134 to 141, while it generates a packet to be transmitted to another terminal equipment and sends it through each of the sub-transmission lines 159 to 166 to each of the separation-insertion units 134 to 141.

FIG. 21 is a block diagram of a network system in which four node devices of FIGS. 20A and 20B are connected by optical fibers. Node devices 175 to 178 shown in FIGS. 20A and 20B are respectively connected to eight terminal equipments 167 to 174 through eight sub-transmission lines 159 to 166. Optical fibers 179 to 182 are each used as an optical wavelength multiplexed transmission line.

In the example illustrated in FIGS. 20A and 20B, a packet from the terminal equipment is inserted, in each of the separation-insertion units 134 to 141, into the packet stream from each of the fixed wavelength reception units 126 to 133. The packet is temporarily stored in each of the buffer units 142 to 149, and then sent out from each of the variable wavelength transmission units 150 to 157 as an optical signal at a predetermined wavelength. The packet is relayed in the node devices located on the way to a node device which is connected to an addressed destination terminal equipment. The packet is then converted into an optical signal at a wavelength, which can be received by one of the fixed wavelength reception units 126 to 133 for outputting the packet to one of the separation-insertion units 134 to 141 connected to the addressed sub-transmission line, and transmitted from one of the variable wavelength transmission units 150 to 157 in the node device upstream of the node device connected to the addressed destination terminal equipment. The packet is finally received by the fixed wavelength reception unit in this node device, then output from the separation-insertion unit therein to the sub-transmission line and received by the addressed terminal equipment.

SUMMARY OF THE INVENTION

In the above example invented by the inventor of the present invention, the exchange unit required in the above-discussed first type of the network system is made unnecessary, and thus an increase in the hardware scale of the node device can be prevented and a relatively low-cost node device is obtained. Further, the arbitration control, which adversely affects the improvement of throughput of the network system, can be dispensed with, and the routing control is simplified. In the above example, however, when the transmitting terminal equipment and the addressed terminal equipment are respectively connected to different separation-insertion units in the same node device (also referred to as this node device, own node device, transmitting node device, source node device or the like in the specification), a packet is transmitted via a somewhat winding route as follows. The packet is transmitted from the variable wavelength transmission unit, and relayed in all of the node devices located in a ring form other than the transmitting node device. Then, the packet is received by the fixed wavelength reception unit for outputting the packet to the separation-insertion unit connected to the addressed terminal equipment. The packet is output from the separation-insertion unit to the sub-transmission line, and finally received by the addressed terminal equipment. Thus, in such a case, a packet is relayed in all the node devices but the transmitting node device.

The present invention has been made in view of the above-discussed problems, and an object thereof is to provide a novel structure for preferably performing a transmission through two sub-transmission lines connected to a common node device, or between terminal equipments connected to different sub-transmission lines belonging to a common node device, in a network system containing a plurality of node devices connected therebetween.

It is another object of the present invention to provide a node device which simplifies the control by dispensing with the arbitration control needed in a conventional exchange unit.

It is another object of the present invention to provide a node device in which channels for receiving signals from a plurality of buffers can be altered without using a conventional exchanger.

It is yet another object of the present invention to provide a control method employed in the above node device, a network system using the node device and a communication method utilized therein.

To achieve the objects, a network system and the like according to the present invention are constructed as follows:

According to one aspect of the present invention, there is provided a network system in which a plurality of node devices are connected with each other to transmit a signal therebetween and a sub-transmission line is connected to the node device. In the network system, the node devices each include:

a plurality of buffers for temporarily storing a signal to be transmitted;

connection means for selecting a channel, to which the signal from each buffer is to be output, from a plurality of channels in such a manner that the plurality of buffers are contemporaneously connected to the different channels, respectively;

a separation unit for receiving the signal to be transmitted along a part of the plurality of channels and outputting the signal to the sub-transmission line to which the node device is connected; and an insertion unit for inputting a signal from the sub-transmission line, to which the node device is connected, into the buffer.

In this network system, a part of plural channels from the connection means is connected to the separation unit and a signal can be output to the sub-transmission line and the terminal equipment connected to this sub-transmission line through the separation unit, so that communication between the terminal equipments connected to the same node device can be performed with no other node devices being used. Here, it should be noted that a signal from the sub-transmission line is input into the connection means through the insertion unit and the buffer. Hence, the number of inputs into the connection means can be reduced in this network system.

In the above structure, a signal from another node device can also be input into the separation unit, so that the signal from another node device can be output to the sub-transmission line through the separation unit. At this time, signals from the connection means of this node device and another node device are input into the separation unit, so that there is a possibility that collision of signals may occur. However, such a problem can be solved by providing a synchronous control unit for controlling the connection means such that the buffer does not output the signal to be transmitted to the part of the plurality of channels during a time period the signal from another node device is inputting into the separation unit.

To transmit the signal from the signal transmitting node device to another node device, the structure only needs to be constructed such that a channel other than the part of the plurality of channels is connected to another node device.

The above structure may be preferably constructed such that numbers of the separation units and the part of the plurality of channels are respectively plural and equal to each other and that different channels of the part of the plurality of channels are respectively connected to the separation units.

Further, in order to relay a signal which is input from another node device and needs to be output to another node device, the structure is constructed such that the signal from another node device is input into the separation unit, that numbers of the separation units and the buffers are respectively plural and equal to each other, that the separation units are respectively connected to the buffers, and that a signal, which is not to be output from the separation unit to the sub-transmission line, is input into the buffer to which the separation unit is connected. Here, it is preferable that the insertion unit is disposed between the separation unit and the buffer. This is because, when the signal is separated in the separation unit and guided to the sub-transmission line, there occurs an empty portion in the signal stream and a signal from the sub-transmission line can be readily inserted into the signal stream in the insertion unit.

Further, the structure may be constructed such that the connection means sequentially alters the channels, to which the buffers respectively output signals, in a predetermined sequence and that a signal of signals stored in the buffer, which is to be output to a predetermined channel, is output from the buffer when the buffer is connected to the predetermined channel. Hence, the arbitration can be dispensed with. In the arbitration, the address of each signal is detached, and the respective buffers are controlled each time the signal is to be transmitted, such that the buffers do not use the same channel contemporaneously.

A variety kinds of channels can be used. For example, the plurality of channels are channels which are respectively discriminated from each other by optical wavelengths, or the plurality of channels are respectively different transmission lines.

The connection means may include a plurality of variable channel transmission means which are provided corresponding to the plurality of buffers, respectively, and a channel, to which the buffer is connected, may be selected by altering an output channel of the variable channel transmission means. More specifically, wavelength tunable light sources may be used. In this structure, the connection means may be constructed without using any switching means. Here, to guide the part of the plural channels output from the connection means to the separation unit, the node device may include means for taking out the part of the plurality of channels from outputs of the plurality of variable channel transmission means and outputting the taken-out channel to the separation unit. When the channels are discriminated from each other by wavelengths, this means is preferably the combination of a power divider and means for selectively transmitting or reflecting the wavelength (for example, a wavelength band pass filter), or a demultiplexer whose output ports branch off depending on the wavelengths.

When the variable channel transmission means is used, plural channels are respectively output from the plural variable channel transmission means. Therefore, the part of the plurality of channels can be effectively picked out by constructing the node device such that it includes means for inputting the outputs of the plurality of variable channel transmission means and a signal input from another node device, into a common transmission line (for example, a multiplexer), and means for taking out the part of the plurality of channels from the common transmission line and outputting the taken-out channel to the separation unit (for example, the combination of a divider and a wavelength filter). Here, it should be noted that the part of the plural channels is picked out after the outputs of the variable channel transmission means and the signal from another node device are input into the common transmission line.

Further, the connection means may be comprised of connection alteration means for connecting inputs from the plurality of buffers to the plurality of channels. In this construction, though a switching device of the connection alteration means is used, the number of inputs into the connection alteration means is inherently small in the present invention and hence the burden of switching is also small. Moreover, when the outputting from the buffers is executed synchronously with the alteration of the connected channels such that the connected channels are altered in a predetermined sequence, no arbitration control is needed and the burden of the switch processing is also reduced notably.

Further, inter-node and intra-node communications can be respectively performed without increasing the number of channels in use, when the structure is built such that a channel other than the part of the plurality of channels is to be output to another node device, that the part of the plurality of channels in a first node device is common to a channel other than the part of the plurality of channels in a second node device which is a node device for inputting the signal into the first node device, and that a channel other than the part of the plurality of channels in the first node device is common to the part of the plurality of channels in a third node device which is a node device to which the first node device outputs the signal. At this time, signals from an other node device and this source node device do not collide with each other, when the connection means in the mutually-adjacent node devices are synchronously controlled and a common channel is not selected contemporaneously.

Further, it is preferable that the connection means sequentially alters the channels, to which the plurality of buffers output signals, respectively, in a predetermined sequence, and that the predetermined sequence includes a first transmission period, during which the connection means connects the respective buffers to the part of the plurality of channels, and a second transmission period during which the connection means connects the respective buffers to a channel other than the part of the plurality of channels. More specifically, when the predetermined sequence is weighted such that one of the first and second transmission periods is longer than the other period, it is possible to preferably cause the channels, which have larger amount of signals to be transmitted, to effectively transmit a lot of signals therethrough.

Further, the signal to be transmitted in the present invention is preferably a packet with address information. The packet may have a fixed length or a variable length, and may include a cell which is so called in ATM communication.

According to another aspect of the present invention, there is provided a communication method for use in a network system in which a plurality of node devices are connected with each other to transmit a signal therebetween, and a sub-transmission line is connected to the node device and the node device includes a plurality of buffers for temporarily storing a signal to be transmitted, connection means for selecting a channel, to which the signal from each buffer is to be output, from a plurality of channels in such a manner that the plurality of buffers are contemporaneously connected to the different channels, respectively, a separation unit for receiving the signal to be transmitted along a part of the plurality of channels and outputting the signal to the sub-transmission line to which this node device is connected, and an insertion unit for inputting a signal from the sub-transmission line, to which this node device is connected, into the buffer. In the communication method, a signal, which is to be output to the sub-transmission line of this node device, out of the signals stored in the buffer, is output from the buffer, when the buffer is connected to the part of the plurality of channels receivable by the separation unit to which the sub-transmission line is connected.

In the above communication method, communication with another node device is possible, when the node device outputs a channel other than the part of the plurality of channels to another node device, and the buffer is so constructed as to output a signal, which is to be output to another node device, out of the signals stored in the buffer, when the buffer is connected to the channel other than the part of the plurality of channels.

In the present invention, the signal directed to the sub-transmission line is transmitted through the separation unit, so that the construction may be built such that when the signal to be output to another node device is a signal to be output to the sub-transmission line of another node device adjacent to this node device on the downstream side in the transmission direction, the buffer outputs the signal when the buffer is connected to a channel receivable by the separation unit in the adjacent node device, to which the addressed sub-transmission line is connected.

In respect of when the signal stored in the buffer should be read (i.e., to which channel the buffer should be connected when a signal stored therein is to be read), when a packet signal with address information is used as the signal, it can be decided in accordance with the address. It should be noted that in the present invention the connection means can select the channel, to which the buffer outputs the signal, and that the separation unit can decide whether or not the signal is to be output to the sub-transmission line. Therefore, the connection means only needs to decide which channel is to be used to transmit the signal.

BRIEF DESCRIPTION OF DRAWINGS

By way of example and to make the description more clear, reference is made to the accompanying drawings in which:

FIG. 2 is a schematic diagram of a network system illustrating the first embodiment according to the present invention;

FIG. 3 is a view illustrating an example of a packet used in the present invention.

FIG. 4 is a block diagram of a fixed wavelength reception unit illustrating the first embodiment according to the present invention;

FIGS. 20A–20B is comprised of FIGS. 20A and 20B showing block diagrams of a node device of a previous U.S. application filed by the inventor of this application.

DETAILED DESCRIPTION OF THE PREFERRED EMBODIMENTS

Embodiments of the present invention will be described with reference to the drawings hereinafter.

(First Embodiment)

Figure 1:
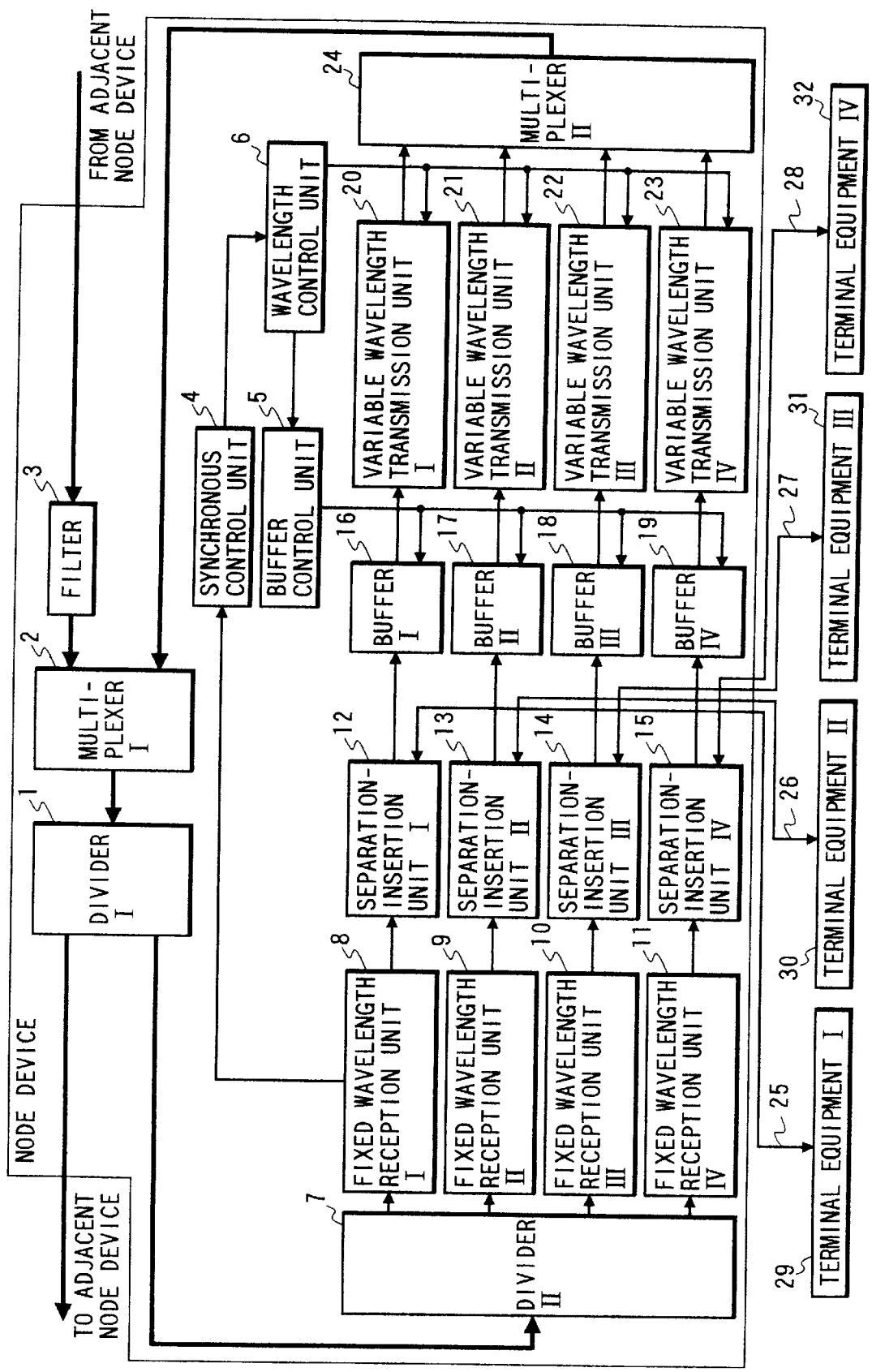
FIG. 1 is a schematic diagram of a node device illustrating a first embodiment according to the present invention.

FIG. 1 is a view of a node device illustrating a first embodiment according to the present invention, in which four sub-transmission lines are connected with a ring-type optical wavelength multiplexed transmission line containing eight channels of wavelengths $\lambda 1$ to $\lambda 8$. Each of the sub-transmission lines is coupled to a terminal equipment.

In FIG. 1, a power divider I 1 is a dividing means for dividing optical signals of plural wavelengths output from a multiplexing means into portions to be guided to the wavelength multiplexed transmission line and plural fixed wavelength reception means in the node device including this power divider I 1. The wavelength multiplexed optical signals from a multiplexer I 2 are divided and output to the divider II 7 and to an adjacent node device through the wavelength multiplexed transmission line composed of an optical fiber (not shown). The multiplexer I 2 is the multiplexing means for combining the optical signal transmitted through an optical demultiplexing means with optical signals output from plural variable wavelength transmission means in the node device including this multiplexer I 2. The combined optical signals from a filter 3 and a multiplexer II 24 are output to the divider II. The filter 3 is the optical demultiplexing means for transmitting only a desired optical signal therethrough out of the signals of plural wavelengths transmitted on the ring-type wavelength multiplexed transmission line. The filter 3 intercepts optical signals, which can not be received by the plural fixed wavelength reception means in this node device, out of the optical signals output from the adjacent node device via the wavelength multiplexed transmission line composed of an optical fiber (not shown).

A synchronous control unit 4 separates a synchronizing signal from an optical signal received by a fixed wavelength reception unit I 8 to conduct a synchronization among the node devices connected in the network system of this embodiment, and outputs the synchronization signal to a wavelength control unit 6. A buffer control unit 5 controls buffers so that, when an addressed sub-transmission line memorized in a buffer is connected to the adjacent node device on a downstream side in the transmission direction, or to this node device, the packet can not be read out from the buffer until two wavelengths match up to each other; one is a wavelength receivable by a fixed wavelength reception unit from which the packet is output to a separation-insertion unit to which the addressed receiving terminal equipment is connected via the adjacent node device or this node device, and the other is a transmission wavelength of a variable wavelength transmission unit from which the packet in the buffer is transmitted. This is because the packet must be output at a wavelength or a channel, to which the addressed sub-transmission line is connected, in this node device. On the other hand, the wavelength control unit 6 controls transmission wavelengths of the variable wavelength transmission units in accordance with a predetermined transmission-wavelength control pattern described later, on the basis of the synchronizing signal output from the synchronous control unit 4.

The divider II 7 divides optical signals output from the divider I 1 into four portions to output them to the four fixed wavelength reception units.

The fixed wavelength reception units I 8 to IV 11 are photodiodes and serve as fixed wavelength reception means.

The fixed wavelength reception units I 8 to IV 11, the internal structure of which will be described later, each receive only a packet which is transmitted as one of optical signals having one of wavelengths $\lambda r1$ to $\lambda r4$. The eight optical wavelengths are classified into a first wavelength group of wavelengths $\lambda 1$ to $\lambda 4$ and a second wavelength group of wavelengths $\lambda 5$ to $\lambda 8$. Corresponding to those optical wavelengths, the wavelengths of $\lambda r1$ to $\lambda r4$ are respectively $\lambda 5$ to $\lambda 8$ in a first group of node devices, while the wavelengths of $\lambda r1$ to $\lambda r4$ are respectively $\lambda 1$ to $\lambda 4$ in a second group of node devices. In the following description, four wavelengths, which are not received by the fixed wavelength reception units in this node device, are referred to as $\lambda s1$ to $\lambda s4$. In the first group of the node devices, the wavelengths $\lambda s1$ to $\lambda s4$ are respectively wavelengths $\lambda 1$ to $\lambda 4$, while in the second group of the node devices, the wavelengths $\lambda s1$ to $\lambda s4$ are respectively wavelengths $\lambda 5$ to $\lambda 8$.

Separation-insertion units I 12 to IV 15 serve as separation-insertion means, each of which is operative to separate a packet, which is to be transmitted to the sub-transmission line, out of a packet stream from the fixed wavelength reception units I to IV and transmit it to the sub-transmission line, while it is operative to add a packet from the sub-transmission line to the packet stream from the fixed wavelength reception units I to IV. The internal structure of the separation-insertion unit will be also described later.

Buffers I 16 to IV 19 serve as buffer means for temporarily storing the packets from the separation-insertion means, the internal structure of which will be also described later. Variable wavelength transmission units I 20 to IV 23 are tunable laser diodes (TLDs) and serve as variable wavelength transmission means, which convert, under the control of the wavelength control unit, the packets from the buffers I to IV into optical signals each having a predetermined wavelength out of wavelengths $\lambda 1$ to $\lambda 8$ and send them to the multiplexer II 24, the internal structure of which will be also described later.

The wavelength multiplexer II 24 multiplexes the optical signals of wavelengths $\lambda 1$ to $\lambda 8$ which are sent from the four variable wavelength transmission units I to IV and applies them to the multiplexer I 2.

Sub-transmission lines I 25 to IV 28 serve as packet transmission lines between the separation-insertion units and the terminal equipments. Terminal equipments I 29 to IV 32 are connected to the sub-transmission lines I to IV, respectively. Each of the terminal equipments receives a packet output from the corresponding separation-insertion units I to IV, while it generates a packet to be transmitted to another terminal equipment and sends it to the separation-insertion units I to IV through the sub-transmission lines I to IV.

FIG. 2 is a block diagram of a network system illustrating the first embodiment according to the present invention, in which four node devices of FIG. 1 are connected by optical fibers. Node devices 33 to 36 shown in FIG. 1 are respectively connected through the four sub-transmission lines with four terminal equipments. Optical fibers 37 to 40 are each used as an optical wavelength multiplexed transmission line. The transmission direction of the optical signals is a counter-clockwise direction. Here, the node devices I 33 and III 35 belong to the first group and the node devices II 34 and IV 36 belong to the second group.

FIG. 3 illustrates the structure of a packet to be transmitted in this embodiment. Numeral 41 designates an address portion of the addressed terminal equipment of this packet. Numeral 42 is a data portion carried by this packet. In this example, bit lengths of the address portion 41 and data portion 42 are fixed, but those may be variable. Those only need to be decided as a network setting specification.

FIG. 4 shows the internal structure of each of the fixed wavelength reception units I 8 to IV 11 which are utilized in the node device of the first embodiment according to the present invention.

In FIG. 4, a filter 43 transmits only an optical signal having a fixed wavelength assigned to each fixed wavelength reception unit, while optical signals of the other wavelengths being intercepted. In other words, each of the filters in each fixed wavelength reception unit transmits a wavelength specifically assigned to each of the fixed wavelength reception units; $\lambda r1$ to the fixed wavelength reception unit I 8, $\lambda r2$ to the fixed wavelength reception unit II 9, $\lambda r3$ to the fixed wavelength reception unit III 10, and $\lambda r4$ to the fixed wavelength reception unit IV 11.

A reception unit 44 is a photodiode for converting the optical signal, transmitted through the filter 43 at the predetermined wavelength, into an electric signal and outputting it to the separation-insertion unit. This reception unit contains therein a pin photodiode (Pin-PD), the back stage of which is connected to an amplifier for amplifying a sensed electric signal, an equalizer for compensating for a difference from a predetermined level and a discrimination circuit for waveform-shaping the signal prior to its output operation of the input packet.

Figure 5:
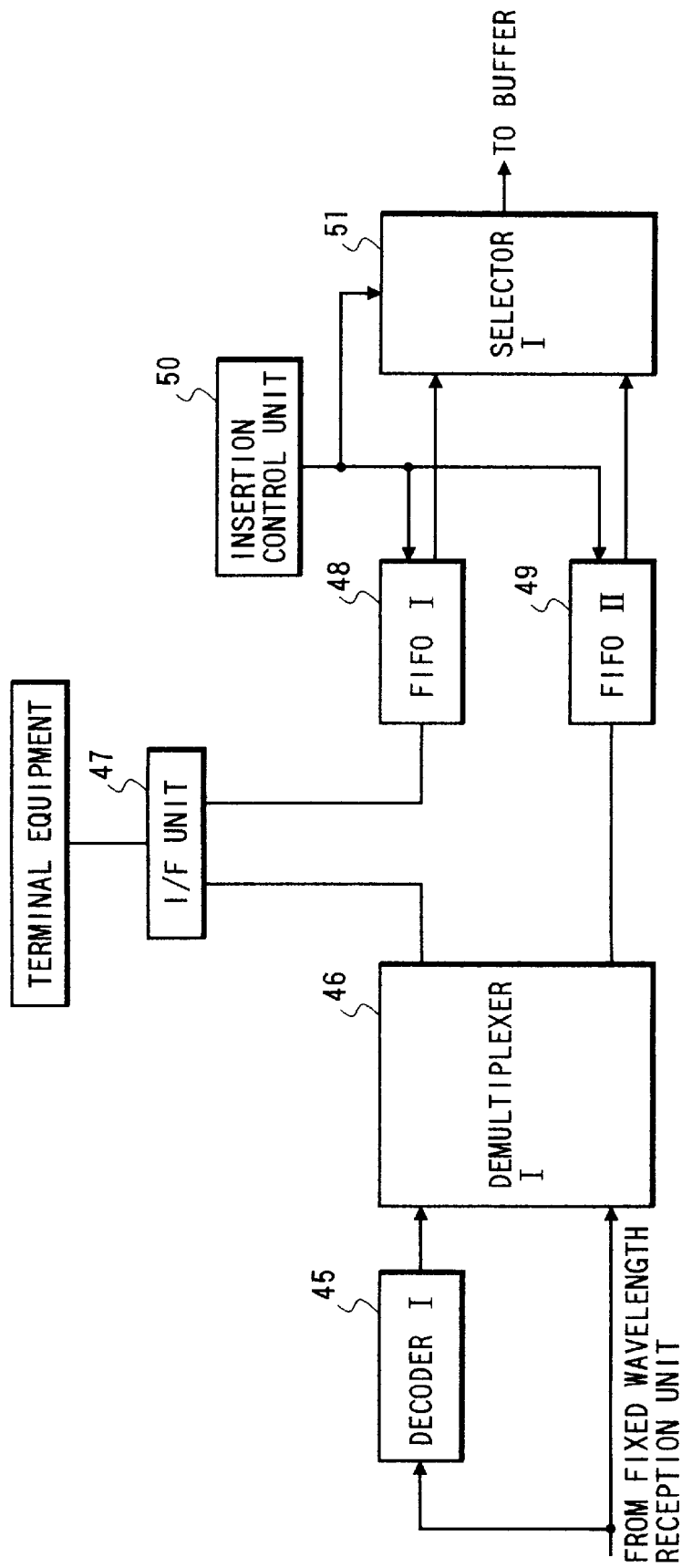
FIG. 5 is a block diagram of a separation-insertion unit illustrating the first embodiment according to the present invention.

FIG. 5 shows the internal structure of each of separation-insertion units I 12 to IV 15 which are utilized in the node device of the first embodiment according to the present invention. The same internal structure is applied to all the separation-insertion units and the description will be made with respect to only one unit.

In FIG. 5, a decoder I 45 reads the address portion of an input packet and instructs a demultiplexer I 46 as to whether the packet should be output to the sub-transmission lines 25 to 28 or not. The demultiplexer I 46 outputs the input packet to an I/F unit 47 or a FIFO II 49 in accordance with instructions from the decoder I 45. The I/F unit 47 is operative to send the packet from the demultiplexer I 46 to the terminal equipments 29 to 31 through the sub-transmission lines 25 to 28 and output a packet from the sub-transmission lines 25 to 28 to a FIFO I 48.

The FIFOs (First In First Out) I 48 and II 49 temporarily store the input packets and output them to a selector I 51, in order of input, in accordance with control instructions from an insertion control unit 50. The insertion control unit 50 controls reading operation of both the FIFO I 48 and FIFO II 49. The insertion control unit 50 also instructs a selector I 51 as to which FIFO of the FIFOs 48 and 49 should be selected, so that the packet transmitted on the sub-transmission lines 25 to 28 can be added to the packet stream from the fixed wavelength reception units 8 to 11. The selector I 51 then selects the FIFO 48 or 49 in accordance with instructions from the insertion control unit 50, the FIFO storing the packet to be output.

Figure 6:
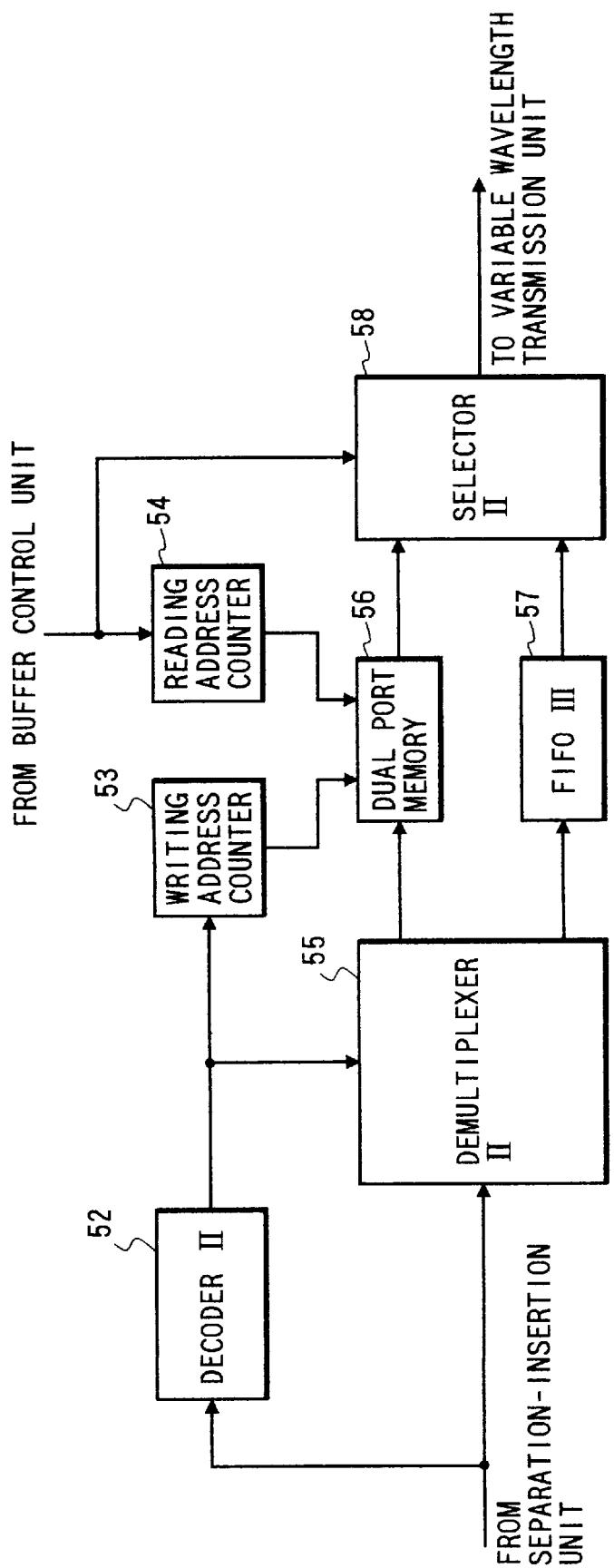
FIG. 6 is a block diagram of a buffer unit illustrating the first embodiment according to the present invention.

FIG. 6 shows the internal structure of each of buffers I 16 to IV 19 which are utilized in the node device of the first embodiment according to the present invention. The same internal structure is applied to all of the buffers I 16 to IV 19 and the description will be made with respect to only one buffer.

In FIG. 6, a decoder II 52 reads the address portion 41 of the input packet and determines whether or not a destination of the packet is the terminal equipment connected to the node device, in which those buffers are contained, or the adjacent node device. If not, the decoder II 52 instructs a demultiplexer II 55 to set its output destination to a FIFO III 57. On the other hand, if it is the terminal equipment connected to this node device or the adjacent node device, the decoder II 52 instructs the demultiplexer II 55 to set its destination to a dual port memory 56, and at the same time instructs a writing address counter 53 to set a writing start address value of the dual port memory 56, into which the packet to be written, in accordance with a wavelength to be received by the fixed wavelength reception means from which the packet is output to the separation-insertion means 12 to 15 in this node device or the adjacent node device to which the addressed destination sub-transmission line is connected.

The writing address counter 53 starts with the writing start address value, which is output from the decoder II 52, and outputs address signals for writing the packet from into the dual port memory 56 in due order. Similarly, a reading address counter 54 starts with an offset value as a reading start address, which is output from the buffer control unit 5, and outputs address signals for reading the packet from the dual port memory 56 in due order.

The demultiplexer II 55 outputs the input packet to the dual port memory 56 or the FIFO III 57 in accordance with instructions from the decoder II 52. The dual port memory 56 is operative to perform reading and writing of the packet data independently.

Figure 7:
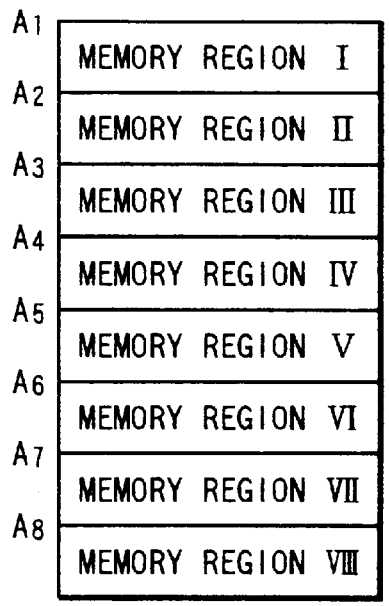
FIG. 7 is a diagram of a memory map of a dual port memory illustrating the first embodiment according to the present invention.

Memory regions of the dual port memory 56, as shown in a memory map of FIG. 7, is divided into eight regions; memory regions I to VIII, in accordance with wavelengths for transmitting packets, each of which corresponds to each channel, i.e., either of transmission wavelengths λ1 to λ8. A start of address in each memory region is A1, A2, A3, A4, A5, A6, A7 or A8.

The FIFO (First In First Out) III 57 temporarily stores the packets input thereinto and outputs them to a selector II 58 in order of input, under the control of the reading control unit. The selector II 58 selects, in accordance with instructions from the buffer control unit 5, either of outputs; one is from the dual port memory 56 and the other is from the FIFO III 57, and outputs it to the variable wavelength transmission units I to IV.

Figure 8:
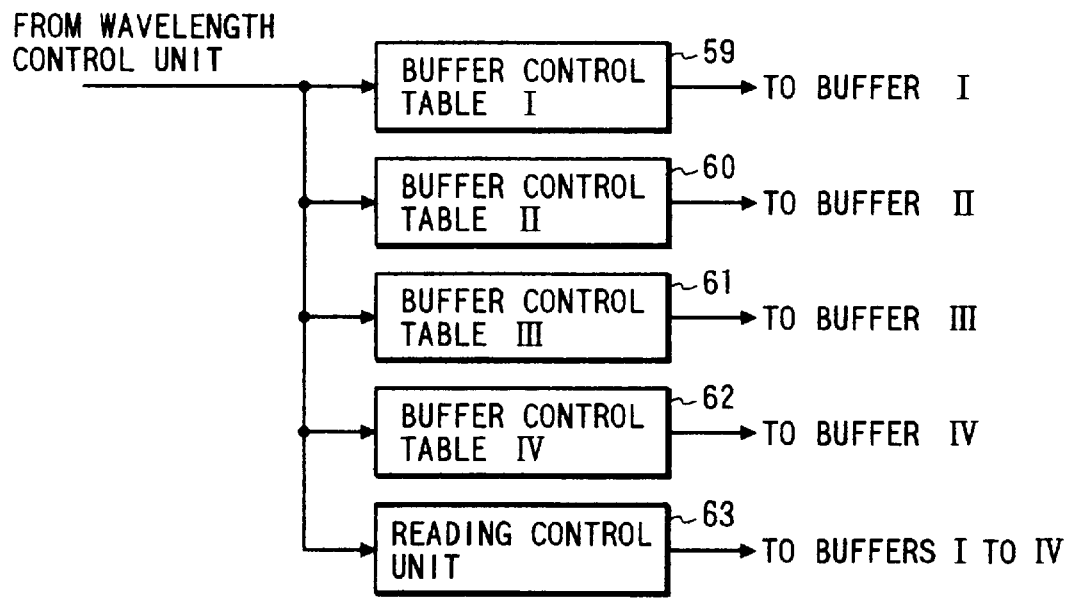
FIG. 8 is a block diagram of a buffer control unit illustrating the first embodiment according to the present invention.

FIG. 8 shows the internal structure of the buffer control unit 5 which is utilized in the first embodiment according to the present invention. In FIG. 8, buffer control tables I 59 to IV 62 are read out in order in response to the address value which is output from the wavelength control unit 6. Then, predetermined offset values are respectively output to the reading address counters 54 in the buffers I to IV. These tables are incorporated in a read-only memory (ROM). The contents of the buffer control tables I 59 to IV 62 will be described later.

A reading control unit 63 counts clock signals which are output from the wavelength control unit 6, so that the reading control signal can be output to the buffers I 16 to IV 19. The reading control signal controls the read-out of both the dual port memory 56 and the FIFO III 57.

Figure 9:
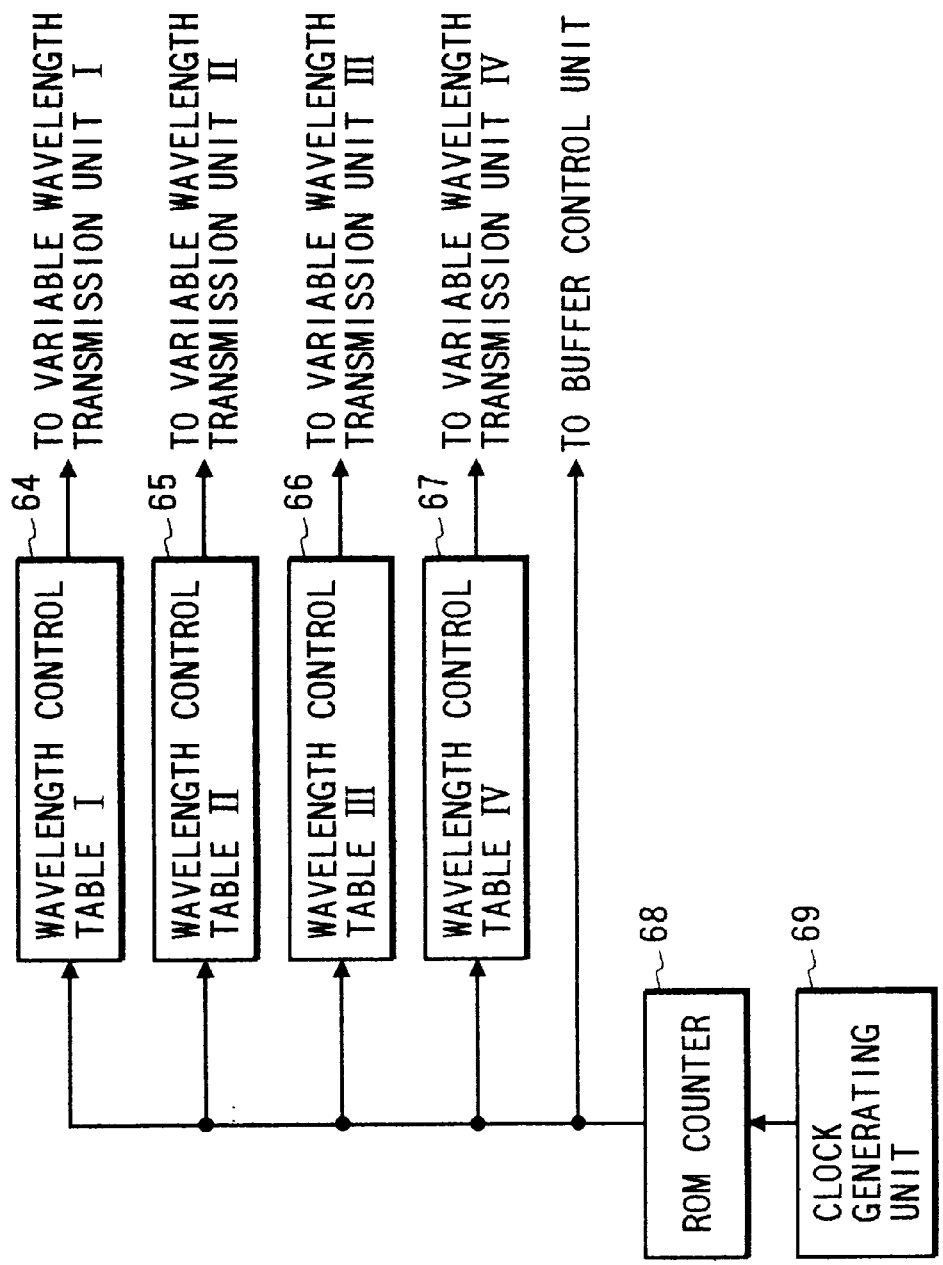
FIG. 9 is a block diagram of a wavelength control unit illustrating the first embodiment according to the present invention.

FIG. 9 shows the internal structure of the wavelength control unit 6 which is utilized in the first embodiment according to the present invention. In FIG. 9, wavelength control tables I 64 to IV 67 are read out in order in response to the address value which is output from a 2-bit ROM counter 68. Then, predetermined wavelength control signals are respectively output to respective drive units in the variable wavelength transmission units 20 to 23. These tables are also incorporated in the read-only memory (ROM). The contents of the wavelength control tables I 64 to IV 67 will be also described later.

Then, a clock generating unit 69 generates a predetermined clock signal, frequency-demultiplies it and outputs the demultiplied one to the ROM counter 68 and further to the buffer control unit 5 from the ROM counter 68.

Figure 10:
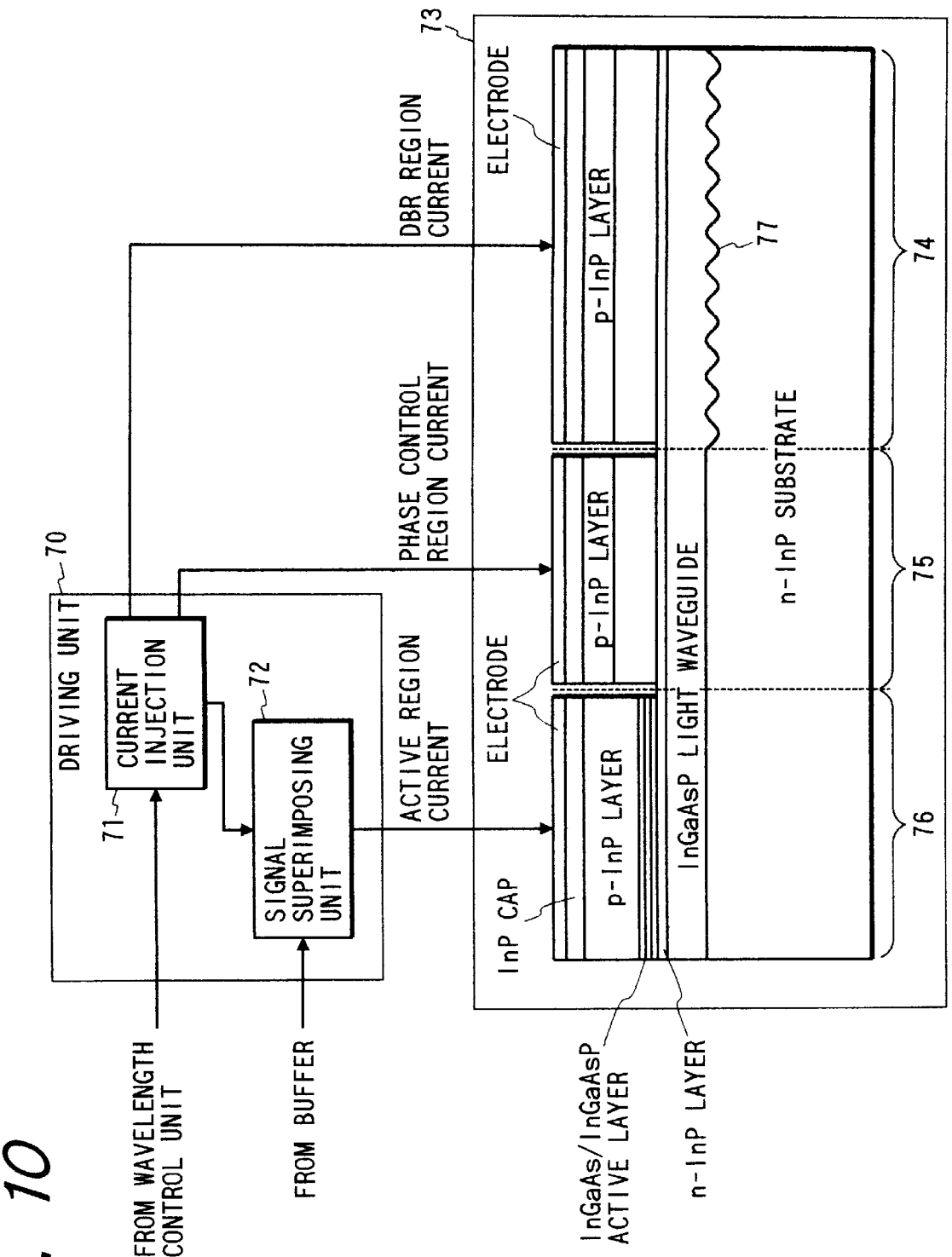
FIG. 10 is a block diagram of a variable wavelength transmission unit illustrating the first embodiment according to the present invention.

FIG. 10 shows the internal structure of each of variable wavelength transmission units I 20 to IV 23 which are utilized in the node device of the first embodiment according to the present invention. The same internal structure is applied to all of the variable wavelength transmission units I 20 to IV 23 and the description will be made with respect to only one unit.

In FIG. 10, a drive unit 70 includes a signal superimposing unit 72 and a current injection unit 71 therein. The current injection unit 71 controls bias current values which are to be respectively injected into three regions of a DBR-type tunable laser diode (TLD); emission active region, phase control region and DBR region, in response to the wavelength control signal output from the wavelength control unit 6, so as to control the transmission wavelengths to predetermined ones. The signal superimposing unit 72 superimposes an electric signal from the buffers 16 to 19 on the bias current from the current injection unit 71, so that the optical signal, to which intensity modulation has been made at a predetermined wavelength, can be sent from the DBR-type tunable laser diode (TLD) 73.

The DBR region 74 varies its refractive index in accordance with an amount of injected carriers so that the transmission wavelength can be varied. The phase control region 75 matches phases of the transmission wavelength in the DBR region 74 and the emission active region 76 to each other. The emission active region 76 is an active region for laser oscillation. Then, represented by numeral 77 is a diffraction grating which makes a single-mode transmission wavelength in the DBR region 74.

In the first embodiment, the contents of the wavelength control tables I 64 to IV 67 mentioned above are set as shown in Table 1 below.

TABLE 1

| table name | address | | | | | | | |
|---|---|---|---|---|---|---|---|---|
| | 0 | 1 | 2 | 3 | 4 | 5 | 6 | 7 |
| wavelength control table I | λs1 | λs2 | λs3 | λs4 | λr1 | λr2 | λr3 | λr4 |
| wavelength control table II | λs4 | λs1 | λs2 | λs3 | λr4 | λr1 | λr2 | λr3 |
| wavelength control table III | λs3 | λs4 | λs1 | λs2 | λr3 | λr4 | λr1 | λr2 |
| wavelength control table IV | λs2 | λs3 | λs4 | λs1 | λr2 | λr3 | λr4 | λr1 |

The table 1 shows the wavelengths transmitted from the variable wavelength transmission units 20 to 23 under the control of the wavelength control unit 6. Further, the offset values of the buffer control tables I 59 to IV 62 are set as shown in Table 2.

TABLE 2

| table name | address | | | | | | | |
|---|---|---|---|---|---|---|---|---|
| | 0 | 1 | 2 | 3 | 4 | 5 | 6 | 7 |
| buffer control table I | A1 | A2 | A3 | A4 | A5 | A6 | A7 | A8 |
| buffer control table II | A4 | A1 | A2 | A3 | A8 | A5 | A6 | A7 |
| buffer control table III | A3 | A4 | A1 | A2 | A7 | A8 | A5 | A6 |
| buffer control table IV | A2 | A3 | A4 | A1 | A6 | A7 | A8 | A5 |

Those eight tables are all read out synchronously by the ROM counter 68. Circular transition phases of the transmission wavelengths of the respective tunable laser diodes (TLDS) are shifted from each other such that those TLDs do not transmit signals at the same wavelength. As discussed above, the transmission wavelength control pattern is determined in accordance with the wavelength control tables I to IV.

Turning now to Tables 1 and 2, when the transmission wavelength of the variable wavelength transmission units 20 to 23 for performing the transmission in a first direction is λs1, the value A1 of the memory region I is assigned to the offset value for read-out of the buffer's dual port memory 56. When the transmission wavelengths of the variable wavelength transmission units 20 to 23 for performing the transmission in the first direction are respectively λs2, λs3, λs4, λr1, λr2, λr3 and λr4, the values of the memory regions II, III, IV, V, VI, VII and VIII are respectively assigned to the offset value for read-out of the buffer's dual port memory 56.

In addition, the memory regions I to VIII in the dual port memory 56 in the buffers I to IV shown in FIG. 6 respectively correspond to the wavelengths to be received by the fixed wavelength reception units 8 to 11 from which the packet is output to the separation-insertion units 12 to 15 connected to the addressed sub-transmission lines 25 to 28 in the adjacent node device or their own node device. Since the wavelength control tables I to IV and the buffer control tables I to IV are set respectively as shown in Tables 1 and 2, the packet data stored in each buffer I to IV is not read out from the buffer under control until the wavelength of the variable wavelength transmission unit I to IV matches up to the wavelength receivable by the fixed wavelength reception unit I to IV from which the packet is output to the separation-insertion unit I to IV connected to the addressed sub-transmission line 25 to 28 in the adjacent node device or their own node device.

Figure 11:
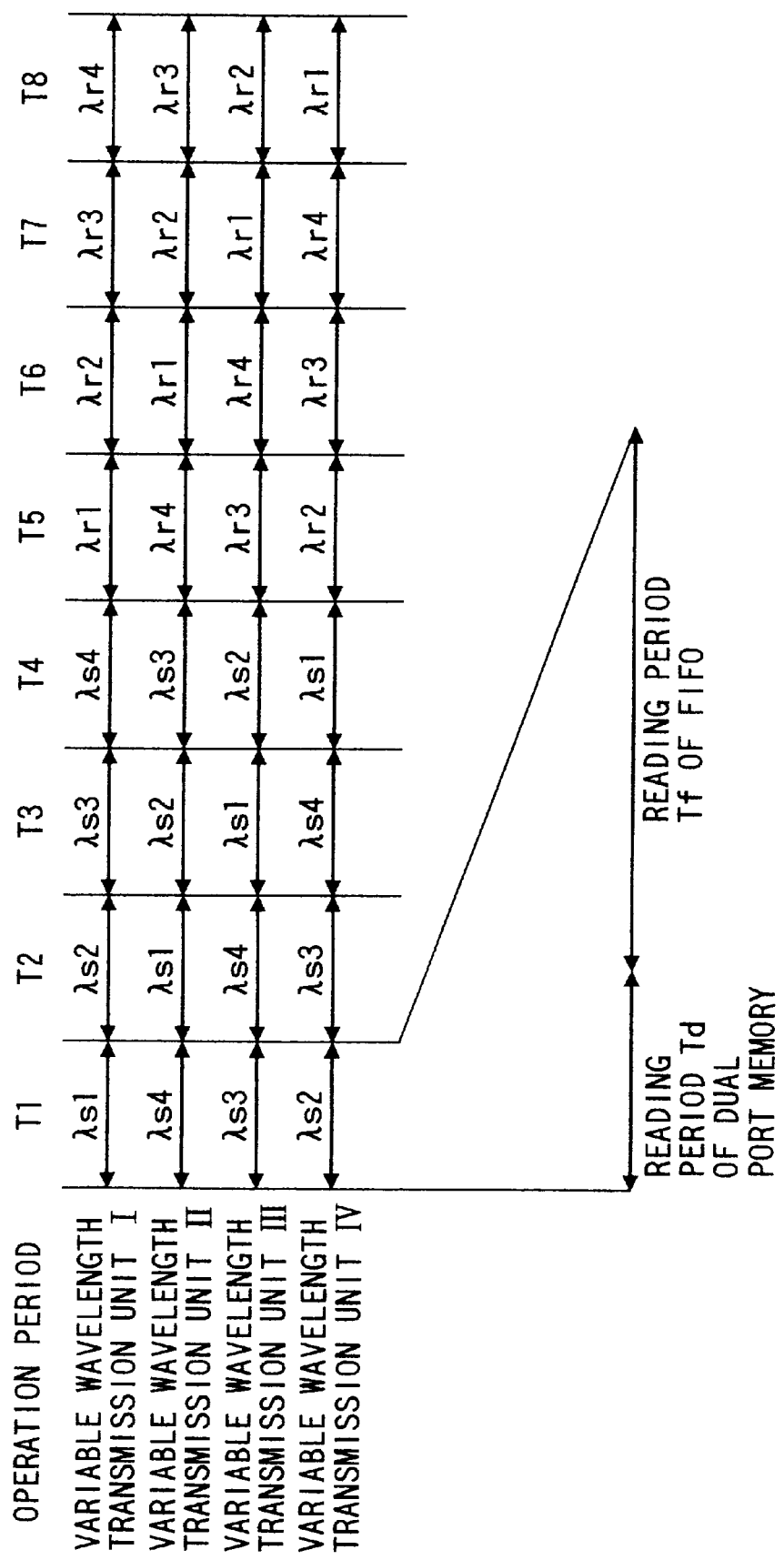
FIG. 11 is a time chart illustrating the first embodiment according to the present invention.

Now, description will be made as to the operation of the first embodiment according to the present invention with reference to the block diagrams of FIGS. 1 through 10 and a time chart of FIG. 11. The description will be made with respect to two cases;

First Case: a packet transmission utilizing the terminal equipment I 29 as the transmitting terminal connected to the node device I 33 through the sub-transmission line I 25 and the terminal equipment IV 32 as the receiving terminal connected to the node device III 35 through the sub-transmission line IV 28 (relayed transmission between the different node devices).

Second Case: a packet transmission utilizing the terminal equipment I 29 as the transmitting terminal connected to the node device I 33 through the sub-transmission line I 25 and the terminal equipment III 31 as the receiving terminal connected to the same node device I 33 through the sub-transmission line III 27 (relayed transmission in the same node device).

Hereinafter, the packet to be transmitted is called a packet A. Also, the same elements in different node devices are represented by common reference numerals used in FIGS. 1 through 10 for convenience' sake.

The operation of the node device according to the first embodiment is composed of eight consecutive operation periods T1, T2, T3, T4, T5, T6, T7 and T8. The eight operation periods are each divided into a period Td for reading the dual port memory 56 and a period Tf for reading the FIFO III 57 in accordance with the buffer operation. During the period Td, the dual port memory 56, in which the packet to be output at a predetermined channel or wavelength is stored, is read. During the period Tf, the FIFO III 57, in which the packet allowed to be output at any predetermined channel or wavelength, is read. In this embodiment, operation periods T1 to T4 constitute a first transmission period (Ts) in which the packet is transmitted at a wavelength different from the wavelengths receivable by the plural fixed wavelength reception units I to IV contained in this packet-transmitting node device, and which is a period during which the packet is relayed between the node devices. In contrast, operation periods T5 to T8 constitute a second transmission period (Tr) in which the packet is transmitted at a wavelength equal to one of the wavelengths receivable by the plural fixed wavelength reception units I to IV contained in this packet-transmitting node device, and which is a period during which the packet is relayed in this node device.

(First Operation Case)

The transmitting terminal equipment I 29 connected to the node device I 33 through the sub-transmission line I 25 composes the packet A of both the data portion to be transmitted to the receiving terminal equipment IV 32 connected to the node device IV 35 through the sub-transmission line IV 28, and the address portion to exhibit the address of the receiving terminal equipment IV 32 connected to the node device IV 35 through the sub-transmission line IV 28, as shown in FIG. 3.

The transmitting terminal equipment I 29 then transmits the packet A through the sub-transmission line I 25 to the separation-insertion unit I 12 in the node device I 33. The I/F unit 47 in the separation-insertion unit I 12 of the node device I 33 receives the packet A from the sub-transmission line I 25 and writes it in the FIFO I in due order. After writing in the FIFO I, the insertion control unit 50 finds a break in the packet stream read out from the FIFO II 49, causes the selector I 51 to change its output from the input of FIFO II 49 to the input of FIFO I 48, stops reading from the FIFO II 49 and starts reading from the FIFO I 48, so that the packet from the FIFO I 48 can be output from the selector I 51.

After completion of reading the packet A from the FIFO I 48, the insertion control unit 50 stops reading from the FIFO I 48 and starts again reading from the FIFO II 49, so that the packet from the FIFO II 49 can be output again from the selector I 51. The packet A from the selector I is then input into the buffer I 16.

In the buffer I 16, the decoder II 55 reads the address portion of the input packet A. In this case, since the destination for receiving the packet A is not the sub-transmission line connected to the packet-transmitting node device I or the adjacent node device II, the node device I treats the packet A as being a packet to which the predetermined transmitting wavelength (channel) need not be assigned, and the decoder II 52 sets such that the demultiplexer II 55 outputs to the FIFO III 57. In this case, assuming that the packet A is written in the FIFO III during the operation period T8, it is to be read out, under the control of the buffer control unit 5, during the reading period Tf for the FIFO III 57 in the subsequent operation period T1.

In the operation period T1, the ROM counter 68 in the wavelength control unit 6 outputs "0" as a reading address value to the wavelength control tables I 64 through IV 67 at the same time, so that the contents of the wavelength control tables are read out in accordance with the address value.

In this case, the content to be read out from the wavelength control table I 64 is the control signal corresponding to the wavelength λs1=λ1, as shown in Table 1. In the same manner, contents to be read from the wavelength control tables II 65, III 66 and IV 67 are control signals corresponding to the wavelengths λs4=λ4, λs3=λ3 and λs2=λ2, respectively. These control signals are input to the drive units 70 in the variable wavelength transmission unit I 20 through the variable wavelength transmission unit IV 23, respectively. In each drive unit 70, a current to be injected by the current injection unit 71 is determined in accordance with the above wavelength control signal such that the transmission wavelength in each tunable laser diode (TLD) can be set to a predetermined wavelength.

During the reading period Td for the dual port memory 56 of the same operation period T1, the reading address value "0" from the ROM counter 68 in the wavelength control unit 6 is input into the buffer control tables I 59 through IV 63 in the buffer control unit 5. The contents of these buffer control tables I to IV are then read out in accordance with this address value.

In this case, the content to be read out from the buffer control table I 59 is, as shown in Table 2, the offset value A1 corresponding to the memory region I. Similarly, contents to be read out from the other buffer control tables II 60, III 61 and IV 62 are the offset values A4, A3 and A2 respectively corresponding to the memory regions IV, III and II. These offset values are output to the reading address counters 54 in the buffer I 16 through the buffer IV 19, respectively.

Further, the reading control unit 63 in the buffer control unit 5 outputs control signals, in response to the clock signal from the wavelength control unit 6, such as a signal for permitting reading of the dual port memory 56, a signal for inhibiting reading of the FIFO III 57 and a signal for setting the input from the dual port memory 56 to be output from the selector II 58. In accordance with these control signals, the reading address counter 54 in the buffer I 16 starts loading thereinto the offset value A1 from the buffer control table I 59, and counts up by an increment in due order. The counter 54 thus generates an address for reading the packet written in the memory region I and outputs it to the dual port memory 56. The reading address causes the dual port memory 56 to read out and output the packet from the output port thereof to the variable wavelength transmission unit I 20 in due order. It will be understood that the packet to be read out at the moment is destined for the terminal equipment I 29 connected to the adjacent node device II 34 through the sub-transmission line I 25 because its transmission wavelength is $\lambda 1$.

During the period Td for reading the dual port memory of the same operation period T1, the offset value A4 is simultaneously loaded from the buffer control table II 60 into the reading address counter 54 in the buffer II 17, so that the packet written in the memory region IV is read out from the dual port memory 56 and output to the variable wavelength transmission unit II 21 in the same manner as that of the buffer I 16.

Similarly, the packets are read out from the memory regions III and II in the buffers III 18 and IV 19 and output to the variable wavelength transmission units III 22 and the variable wavelength transmission unit IV 34, respectively. At the moment, the packets to be read out during the reading period Td are destined for the terminals equipments connected to the adjacent node device II 34 through the sub-transmission lines I 25 to IV 28, respectively.

Subsequently, during the reading period Tf of the FIFO III 57 of the operation period Ti, the reading control unit in the buffer control unit 5 outputs control signals, in response to the clock signal from the wavelength control unit 6, such as a signal for inhibiting reading of the dual port memory 56, a signal for permitting reading of the FIFO III 57 and a signal for setting the output of the FIFO III 57 to be output from the selector II 58. In accordance with these control signals, the packet in the FIFO III 57 is read out and output to the variable wavelength transmission unit I 20 through the selector II 58 in the buffer I 16.

Similarly, as to the buffers II 17 to IV 19, the packet in the FIFO III 57 is read out in due order and output to the variable wavelength transmission unit II 21 through the variable wavelength transmission unit IV 23, respectively.

The variable wavelength transmission units I 20 to IV 23 change wavelengths of the packets output from the buffers I 16 to IV 19 to ones having predetermined wavelengths (i.e., $\lambda s1=\lambda 1$, $\lambda s4=\lambda 4$, $\lambda s3=\lambda 3$ and $\lambda s2=\lambda 2$), in accordance with the wavelength control signals output from the wavelength control unit, and send them to the wavelength multiplexer I 2 through the multiplexer II 24. At this time, the packet A is transmitted as the optical signal at the wavelength $\lambda 1$ from the variable wavelength transmission unit I 20.

Optical signals, transmitted from the node device IV 36 adjacent to the node device I on the upstream side and transmitted through the filter 3, are also input into the multiplexer I 2. In the network system of this embodiment, the synchronous control unit in each of the node devices I 33 to IV 36 extracts the synchronizing signal from the optical signal sent from the adjacent node device, and controls the clock generating unit 69, so that those four node devices operate synchronously with each other. Since the node device IV 36 belongs to the second node device group, the state of $\lambda s1=\lambda 5$, $\lambda s2=\lambda 6$, $\lambda s3=\lambda 7$ and $\lambda s4=\lambda 8$ is established and the optical signals at $\lambda 5$, $\lambda 6$, $\lambda 7$ and $\lambda 8$ are transmitted therefrom during the operation period T1. Those optical signals are input into the filter 3 via the optical fiber (not shown). Since the node device I 33 belongs to the first node device group, the filter 3 intercepts the optical signals at the wavelengths $\lambda 1$ to $\lambda 4$. Therefore, the optical signals at $\lambda 5$, $\lambda 6$, $\lambda 7$ and $\lambda 8$ sent out from the node device IV 36 are transmitted through the filter 3 and input into the multiplexer I 2.

In the multiplexer I 2, the optical signals at $\lambda 1$, $\lambda 2$, $\lambda 3$ and $\lambda 4$ sent out from the variable wavelength transmission units I 20 to IV 23 in the node device I 33 are multiplexed with the optical signals at $\lambda 5$, $\lambda 6$, $\lambda 7$ and $\lambda 8$ sent out from the node device IV 36, and the multiplexed signals are output to the divider I 1.

In the divider I 1, the optical signals at $\lambda 1$ to $\lambda 8$ are amplitude-divided and input into the adjacent node device II 34 and the divider II 7. In the divider II 7, those signals are further power-divided into four portions, and input into the fixed wavelength reception units I 12 to IV 15. Since the node device I 33 belongs to the first node device group, the optical signals at $\lambda 5$, $\lambda 6$, $\lambda 7$ and $\lambda 8$ are respectively received by the fixed wavelength reception units I 12 to IV 15. Those are signals output from the node device IV 36.

The optical signals at $\lambda 1$ to $\lambda 8$ output to the adjacent node device II 34 from the divider I 1 of the node device I 33 are transmitted via the optical fiber 37 and input into the filter 3 of the node device II 34. As the node device II 34 belongs to the second node device group, the filter thereof intercepts the optical signals at $\lambda 5$, $\lambda 6$, $\lambda 7$ and $\lambda 8$. Therefore, the optical signals at $\lambda 1$, $\lambda 2$, $\lambda 3$ and $\lambda 4$ output from the variable wavelength transmission units I to IV of the node device I 33 transmit through the filter 3 and input into the multiplexer I 2. However, the optical signals at $\lambda 5$, $\lambda 6$, $\lambda 7$ and $\lambda 8$ output from the variable wavelength transmission units I to IV of the node device IV 36 are intercepted by the filter 3. In the multiplexer I 2, the optical signals at $\lambda 5$, $\lambda 6$, $\lambda 7$ and $\lambda 8$ output from the variable wavelength transmission units I to IV of the node device II 34 (now is the first transmission period Ts) are multiplexed with the optical signals at $\lambda 1$, $\lambda 2$, $\lambda 3$ and $\lambda 4$ output from the variable wavelength transmission units I to IV of the node device I 33 and transmitted through the filter 3, and the multiplexed signals are output to the divider I. The optical signals at $\lambda 1$ to $\lambda 8$ output to the divider I 1 are power-divided by the divider I 1 and output to the divider II 7 and the adjacent node device III 35. The signals are further amplitude-divided into four portions and the four portions are respectively input into the fixed wavelength reception units I 12 to IV 15.

Since the node device II 34 belongs to the second node device group, the state of λr1=λ1, λr2=λ2, λr3=λ3 and λr4=λ4 (i.e., λs1=λ5, . . . λs4=λ8) is established. Therefore, in the fixed wavelength reception unit I 8, only the optical signal at the wavelength λ1 is transmitted through the filter 43 and received by the reception or light receiving unit 44. Since the packet A is sent out from the node device I 33 as the optical signal at λ1, the packet A is received by the fixed wavelength reception unit I 8.

In this case, the packet A received by the fixed wavelength reception unit I 8 in the node device II 34 as the optical signal having the wavelength λ1, is relayed in the node device II 34.

The packet A received by the fixed wavelength reception unit I 8 in the node device II 34 is output to the separation-insertion unit I 12. In the decoder I 45 of the separation-insertion unit I 12, the address portion of the input packet A is read. Since the addressed destination of this packet A is the sub-transmission line connected to the adjacent node device III 35 on the downstream side in the transmission direction and this packet A is not a packet to be separated and output to the sub-transmission line connected to this node device, the decoder sets the output of the demultiplexer I 46 to the FIFO II 49. Thus, the packet A written in the FIFO II 49 is read under the control of the insertion control unit 50, and output to the buffer I 16 through the selector I 51.

Then, the decoder 52 in the buffer I 16 reads the address portion of the packet A again. The packet A is destined for the receiving terminal equipment IV 32 connected to the adjacent node device III 35 through the sub-transmission line IV 28 on the downstream side in the transmission direction, so that the decoder II sets the output destination of the demultiplexer II 55 to the dual port memory 56 and simultaneously outputs the offset value A4 as the writing start address value to the writing address counter 53. The writing address counter 53 loads the writing start address therein, counts up by an increment in due order so as to generate the writing address of the input packet A and outputs it to the dual port memory 56. The packet A has been already input to the input port of the dual port memory 56 through the demultiplexer II 55, so that the packet A is written in the memory region IV in accordance with the address from the writing address counter 53 in due order.

The read-out of the packet A from the dual port memory 56 is controlled to stand by until the operation period T4 in which the transmission wavelength of the variable wavelength transmission unit I 20 in the node device II 34 matches up to the wavelength λ8 receivable by the fixed wavelength reception unit IV for outputting the packet to the separation-insertion unit IV connected to the addressed sub-transmission line IV in the adjacent node device III 35 on the downstream side. The packet A thus written in the memory region IV of the buffer I is read out during the reading period Td for the dual port memory in the operation period T4.

In the operation period T4 (the first transmission period Ts), the ROM counter 68 in the wavelength control unit 4 outputs "3" as the reading address value to the wavelength control tables I 64 through IV 67 at the same time. This address value is used to read out the contents of the wavelength control tables.

At this time, the transmission wavelength of the variable wavelength transmission unit I is set to λs4=λ8. Similarly, the address value "3" is also output to the buffer control unit 5 and the read-out from the buffer control tables is performed. Here, the region to be read out from the dual port memory 56 in the buffer I 16 is set to the memory region IV in which the packet A is written.

Then, the signals in the other buffers are read out under the control of the corresponding control signals, converted into predetermined optical signals in the variable wavelength transmission units and sent through the wavelength multiplexer II 24, the multiplexer I 2 and the divider I 1 to the optical fiber 38, as described above. In other words, the packet A is read out from the dual port memory during the reading period Td of the operation period T4, sent as the optical signal of λ8 from the variable wavelength transmission unit I 30 to the optical fiber 38 through the wavelength multiplexer 24 and input into the node device III 35.

The optical signals at the wavelengths λ1 to λ4 out of the optical signals at the wavelengths λ1 to λ8 transmitted from the node device II 34 through the optical fiber 38 are intercepted by the filer 3 in the node device III 35 and then incident on the fixed wavelength reception units I 8 through IV 11 through the multiplexer I 2, divider I 1 and divider II 7. In the fixed wavelength reception unit IV 11, only the optical signal having the wavelength λ8 can be transmitted through the filter 43 and is received by the photodiode (PD) 44. Since the packet A is sent from the node device II 34 as the optical signal at the wavelength λ8, it is received by the fixed wavelength reception unit IV 11. Then, the packet A is output from the fixed wavelength reception unit IV 11 to the separation-insertion unit IV 15.

The decoder I 45 in the separation-insertion unit IV 15 reads out the address portion of the input packet A. In this case, the packet A is destined for the receiving terminal equipment connected to the its own separation-insertion unit IV 15, so that the decoder I 45 sets the output destination of the demultiplexer I 46 to the I/F unit 47. The packet A is thus output through the demultiplexer I 46 to the I/F unit 47 and received by the addressed receiving terminal equipment IV 32 through the sub-transmission line IV 28. Finally, a desired processing is performed by extracting only the data portion after removing the address portion of the packet A therefrom.

As described above, the packet A has been transmitted from the transmitting terminal equipment I 29 connected to the transmitting node device I 33 through the sub-transmission line I 25 to the receiving terminal equipment IV 32 connected to the node device III 35 through the sub-transmission line IV 28.

In brief, after the packet A is sent at the predetermined wavelength, from the variable wavelength transmission unit I of the node device I, during the first transmission period Ts, it is converted, in the node device II 34 adjacent to the node device III 35 on the upstream side, into the optical signal having the wavelength λ8 receivable by the fixed wavelength reception unit IV 10 for outputting the packet to the separation-insertion unit IV to which the addressed sub-transmission line of the node device III 35 is connected, during the first transmission period Ts. The packet A is then received by the fixed wavelength reception unit IV 11 in the node device III 35, separated in the separation-insertion unit IV 15 and finally received by the terminal equipment IV after transmitted via the sub-transmission line IV 28.

(Second Operation Case)

The second case will be described hereinafter. In the second case, as described above, the transmitting terminal equipment I 29 is connected to the node device I 33 through the sub-transmission line I 25, and the receiving terminal equipment III 31 is also connected to this node device I 33 through the sub-transmission line III 27. The packet A is relayed within this node device.

Similar to the first operation case, the transmitting terminal equipment I 29 connected to the node device I 33 through the sub-transmission line I 25 transmits the packet A to the separation-insertion unit I 12. In the separation-insertion I 12, the packet A is inserted into the packet stream output from the fixed wavelength reception unit I 8, and then input into the buffer I 16.

In the decoder II 52 of the buffer I 16, the address portion of the packet A input thereinto is read out. Since the address of the packet A is the sub-transmission line III connected to this node device I, the decoder II 52 sets the output destination of the demultiplexer II 55 to the dual port memory 56 and outputs "A7" to the writing address counter 53 as the writing start address value. The writing address counter 53 loads this writing start address therein, counts up by an increment to generate the writing address of the input packet A, and outputs the writing address to the dual port memory 56. The packet A has been already input into the input port of the dual port memory 56 through the demultiplexer II 55, and starts to be written into the memory region VII in due order, in accordance with the address output from the writing address counter 53. The read-out of the packet A from the dual port memory 56 is controlled to stand by until the operation period T7 (the second transmission period Tr) in which the transmission wavelength of the variable wavelength transmission unit I 20 in this node device I 33 matches up to the wavelength $\lambda r3=\lambda 7$ which can be received by the fixed wavelength reception unit III 10 for outputting the packet to the separation-insertion unit III 14 connected to the addressed sub-transmission line III 27 of this node device I 33. The packet A written in the memory region VII of the buffer I is thus read during the reading period Td for the dual port memory in the operation period T7.

In the operation period T7, the reading address value of "6" is output from the ROM counter 68 of the wavelength control unit 6 to the wavelength control tables I to IV. The contents of the wavelength control tables I to IV are read in accordance with this address value. At this moment, the transmission wavelength of the variable wavelength transmission unit I is set to the wavelength $\lambda r3=\lambda 7$. Likewise, this address value "6" is also output to the buffer control unit 5, and the contents of the buffer control tables I to IV are read out. The region of the dual port memory 56 of the buffer I 16 to be read therefrom is set to the memory region VII in which the packet A is written. As described above, under the control of the respective control signals, respective buffer I to IV are read out, the read-out signals are converted into signals at predetermined wavelengths in the variable wavelength transmission units I to IV, and those signals are input into the multiplexer I 2 through the multiplexer II 24. The packet A is sent out from the variable wavelength transmission unit I 20 as the optical signal at the wavelength $\lambda 7$.

On the multiplexer I 2 are also incident the optical signals which are sent from the node device IV 36 adjacent to this transmitting node device I 33 on the downstream side and are transmitted through the filter 3. Since the node device IV 36 belongs to the second node device group, the state of $\lambda r1=\lambda 1$, $\lambda r2=\lambda 2$, $\lambda r3=\lambda 3$ and $\lambda r4=\lambda 4$ is established and the optical signals of the wavelengths $\lambda 1$, $\lambda 2$, $\lambda 3$ and $\lambda 4$ are transmitted therefrom during the operation period T7. Those optical signals are incident on the filter 3 through the optical fiber 40. On the other hand, the node device I 33 belongs to the first node device group, the filter 3 intercepts the optical signals of $\lambda 1$ to $\lambda 4$. Therefore, the optical signals of the wavelengths $\lambda 1$, $\lambda 2$, $\lambda 3$ and $\lambda 4$ sent out from the node device IV 36 are intercepted by the filter 3. Further, the node device III 35 located downstream of the node device IV 36 belongs to the first node device group, and transmits therefrom the optical signals of the wavelengths $\lambda 5$, $\lambda 6$, $\lambda 7$ and $\lambda 8$ during the operation period T7 (the second transmission period Tr). Those optical signals, however, are intercepted by the filter 3 in the node device IV 36. As a result, no optical signals are transmitted through the filter 3 in the transmitting node device I 33, and only the optical signals of the wavelengths $\lambda 5$ to $\lambda 8$ from the variable wavelength transmission units I 20 to IV 23 in this node device I 33 are input into the divider I 1 from the multiplexer I 2. In the divider I 1, the optical signals of the wavelengths $\lambda 5$ to $\lambda 8$ are power-divided and the divided portions are sent out to the adjacent node device II 34 and the divider II 7. The optical signals of the wavelengths $\lambda 5$ to $\lambda 8$ output to the adjacent node device II 34 are intercepted by the filter 3 in the node device II 34, similarly to the above. In the divider II 7, the optical signals of the wavelengths $\lambda 5$ to $\lambda 8$ are further divided into four portions, and the divided portions are respectively input into the fixed wavelength reception units I 8 to IV 11. Since the node device I 33 belongs to the first node device group, the fixed wavelength reception units I 8 to IV 11 respectively receive the optical signals of the wavelengths $\lambda 5$ to $\lambda 8$. Those optical signals are transmitted from the variable wavelength transmission units I to IV in this transmitting node device I 33.

In the fixed wavelength reception unit III 10, only the optical signal of the wavelength $\lambda 7$ is transmitted through the filter 43, and received by the light receiving unit 44 of the photodiode (PD). Since the packet A is the packet which is sent from the node device I 33 as the optical signal of the wavelength $\lambda 7$, it is received by the fixed wavelength reception unit III 10. The packet A received by the fixed wavelength reception unit III 10 is output to the separation-insertion unit III 14. In the decoder I 45 of the separation-insertion unit III 14, the address portion of the input packet A is read. Since the address of the packet A is the sub-transmission line III 27 connected to this separation-insertion unit III 14, the decoder I 45 sets the output destination of the demultiplexer I 46 to the I/F unit 47. The packet A is thus output to the I/F unit 47 through the demultiplexer and transmitted through the sub-transmission line III 27. After that, the packet A is received by the addressed receiving terminal equipment III 31. After the address portion of the packet A is removed, only the data portion is extracted and a desired processing is performed.

As described above, the packet A has been transmitted from the transmitting terminal equipment I 29 connected to the transmitting node device I 33 through the sub-transmission line I 25 to the receiving terminal equipment III 31 connected to the same node device I 33 through the sub-transmission line III 27.

In brief, the packet A is relayed within the same node device during the second transmission period Tr, and received by the terminal equipment III 31 connected to this node device I 33 through the sub-transmission line III 27.
(Modification of First Embodiment)

Figure 12:
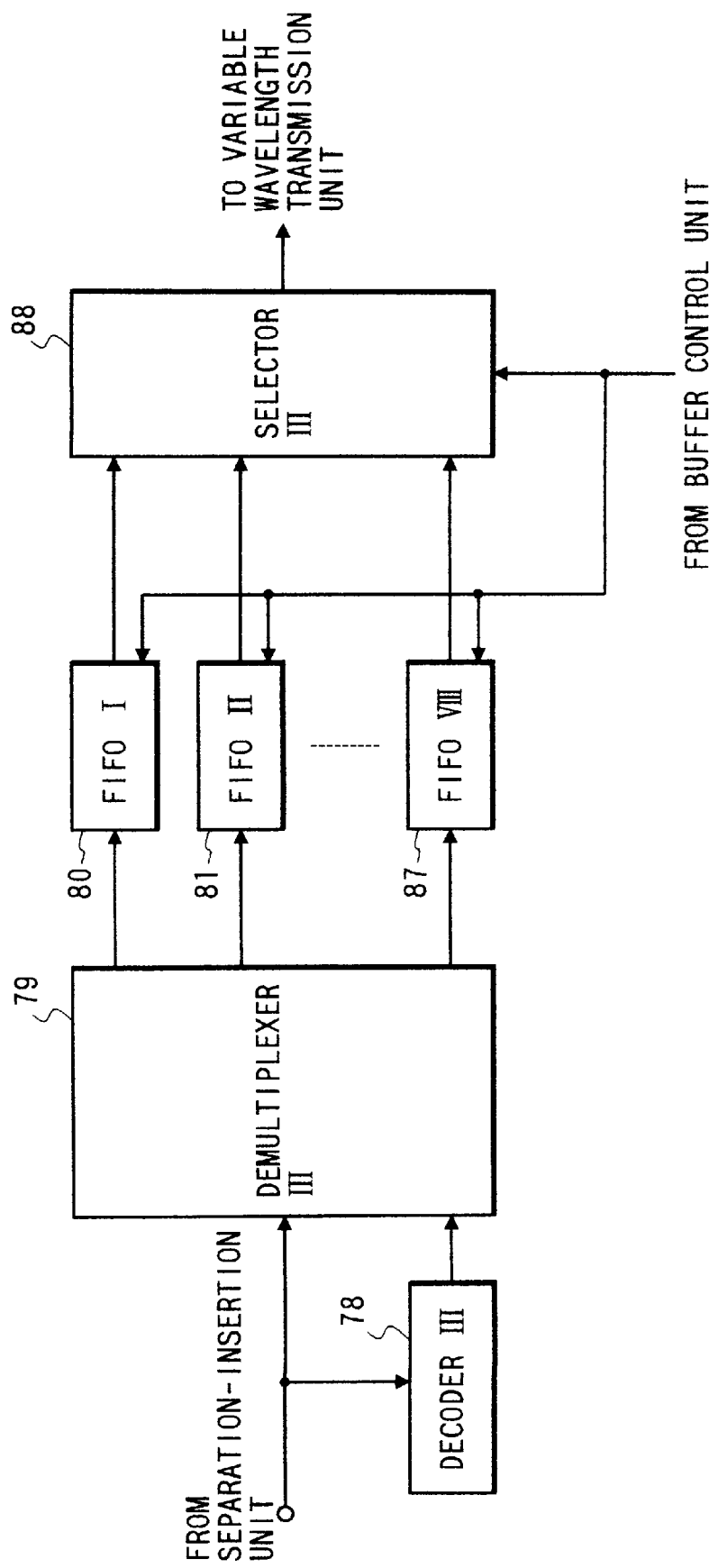
FIG. 12 is a block diagram of a buffer unit illustrating a modified example of the first embodiment according to the present invention.

FIG. 12 shows a modification of the first embodiment in which the internal structure of the buffers I 16 to IV 19 of the first embodiment is modified.

In FIG. 12, a decoder III 78 reads the address portion of an input packet, selects a FIFO for writing the packet therein out of FIFOs I 80 to VIII 87 and instructs a demultiplexer III 79 on the selected FIFO. The demultiplexer III 79 is operative to output the packet signal input from the separation-insertion units 12 to 15 to the selected FIFO in accordance with the instructions from the decoder III 78. The FIFOs I 80 to VIII 87 are provided for respective transmission wavelengths, which temporarily store packet signals from the demultiplexer III 79 and read out them in accordance with the instructions from the buffer control unit 5. A selector III 88 selects a predetermined FIFO from the FIFOs I 80 to VIII 87 under the control of the buffer control unit 5, and outputs its output signal to the fixed wavelength transmission unit.

The following Table 3 shows an example of the buffer control tables which can be preferably utilized in the buffer structure of FIG. 12. In this example, the numbers of the read-out FIFOS are indicated. The structure of the buffer control unit is the same as that of the FIG. 8.

TABLE 3

| table name | address | | | | | | | |
| --- | --- | --- | --- | --- | --- | --- | --- | --- |
| | 0 | 1 | 2 | 3 | 4 | 5 | 6 | 7 |
| wavelength control table I | I | II | III | IV | V | VI | VII | VIII |
| wavelength control table II | IV | I | II | III | VIII | V | VI | VII |
| wavelength control table III | III | IV | I | II | VII | VIII | V | VI |
| wavelength control table IV | II | III | IV | I | VI | VII | VIII | V |

In this embodiment, the FIFOs I to VIII are selected as shown in the buffer control tables of Table 3 during each operation period, so that the written packet signals are read out and output to the variable wavelength transmission units 20 to 23, respectively. For example, during the operation period Ti, the FIFO I is selected in the buffer I 16 so that the packet written therein can be read out and output to the variable wavelength transmission unit I 20.

This embodiment uses a plurality of the FIFOs so that the offset values do not need to be output to the reading address counter 54 described in the first embodiment. Thus, the structure of the buffer unit can be effectively simplified.

(Second Embodiment)

Figure 13:
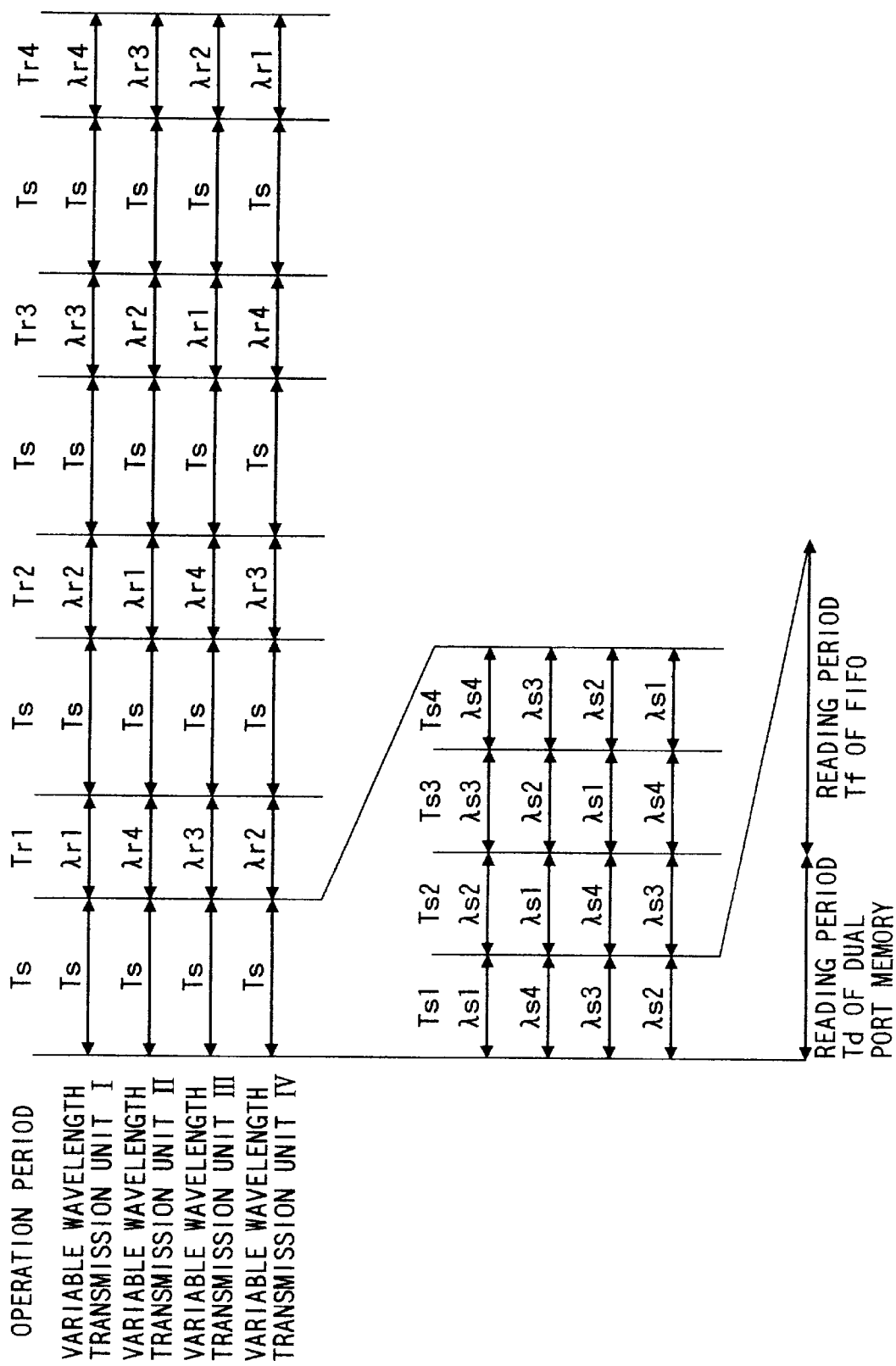
FIG. 13 is a time chart illustrating a second embodiment according to the present invention.
Figure 14:
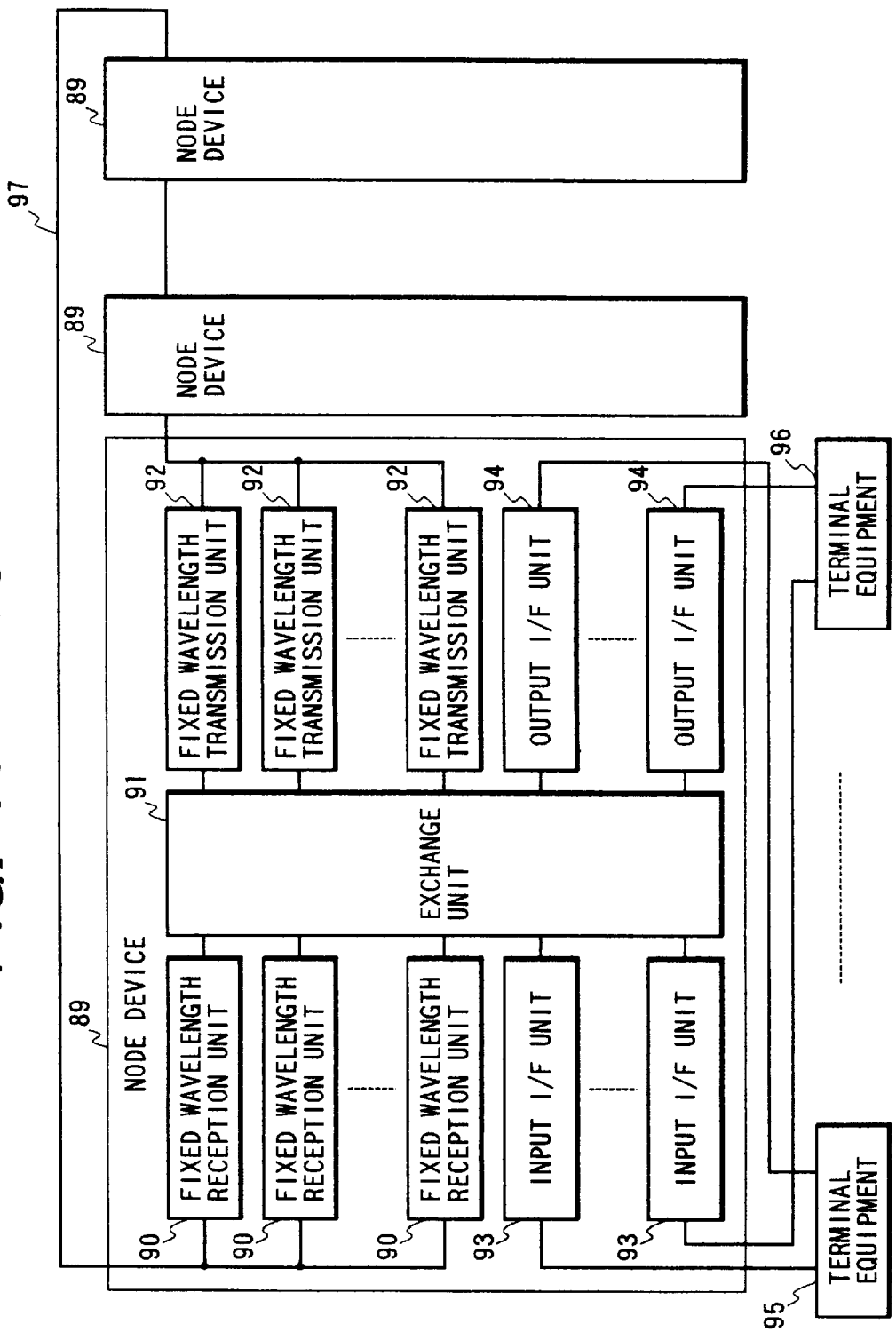
FIG. 14 is a block diagram of a ring-type network system illustrating a prior art.
Figure 15:
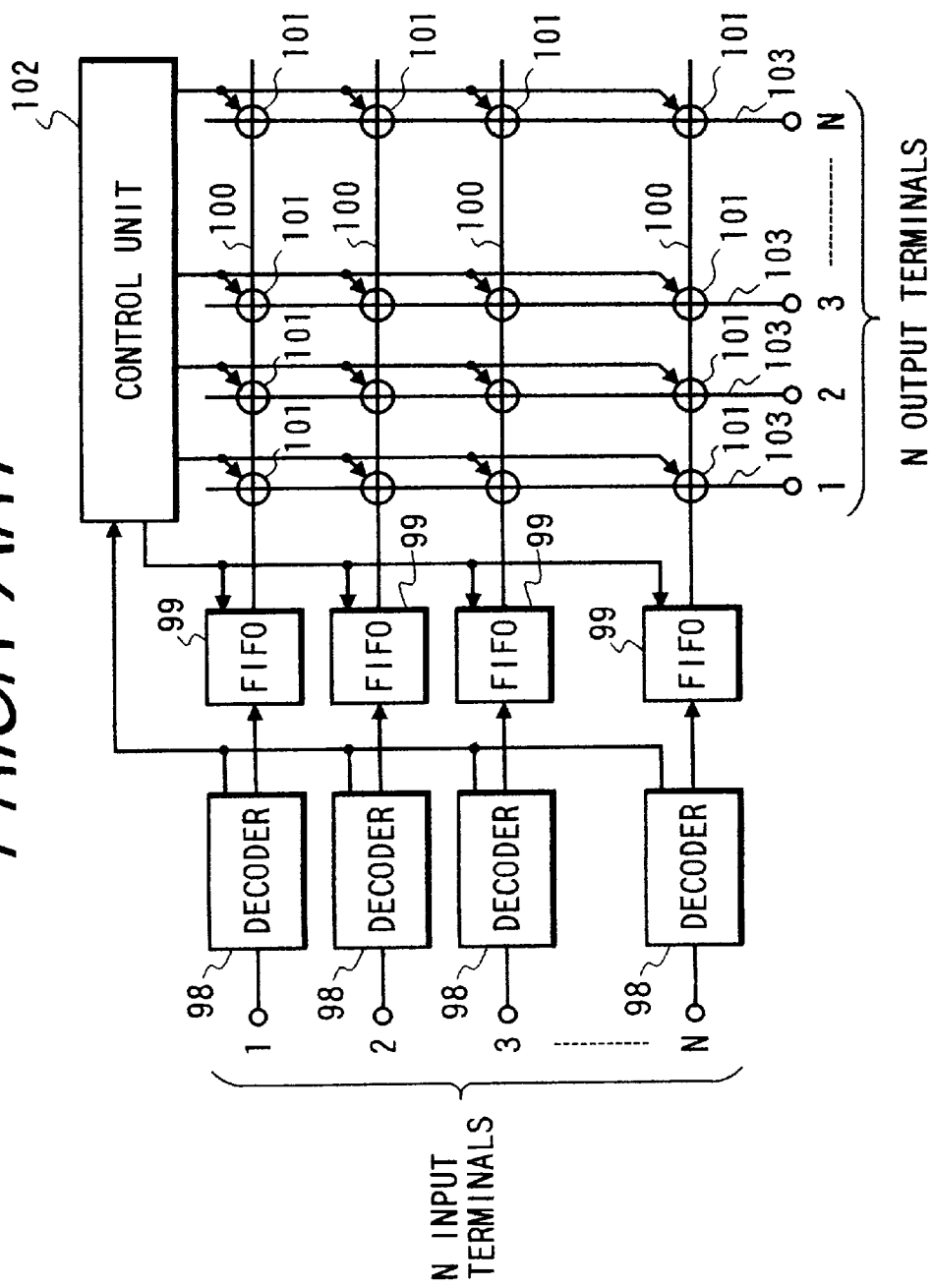
FIG. 15 is a block diagram of an 8×8 electric switch illustrating a prior art network exchanger.
Figure 16:
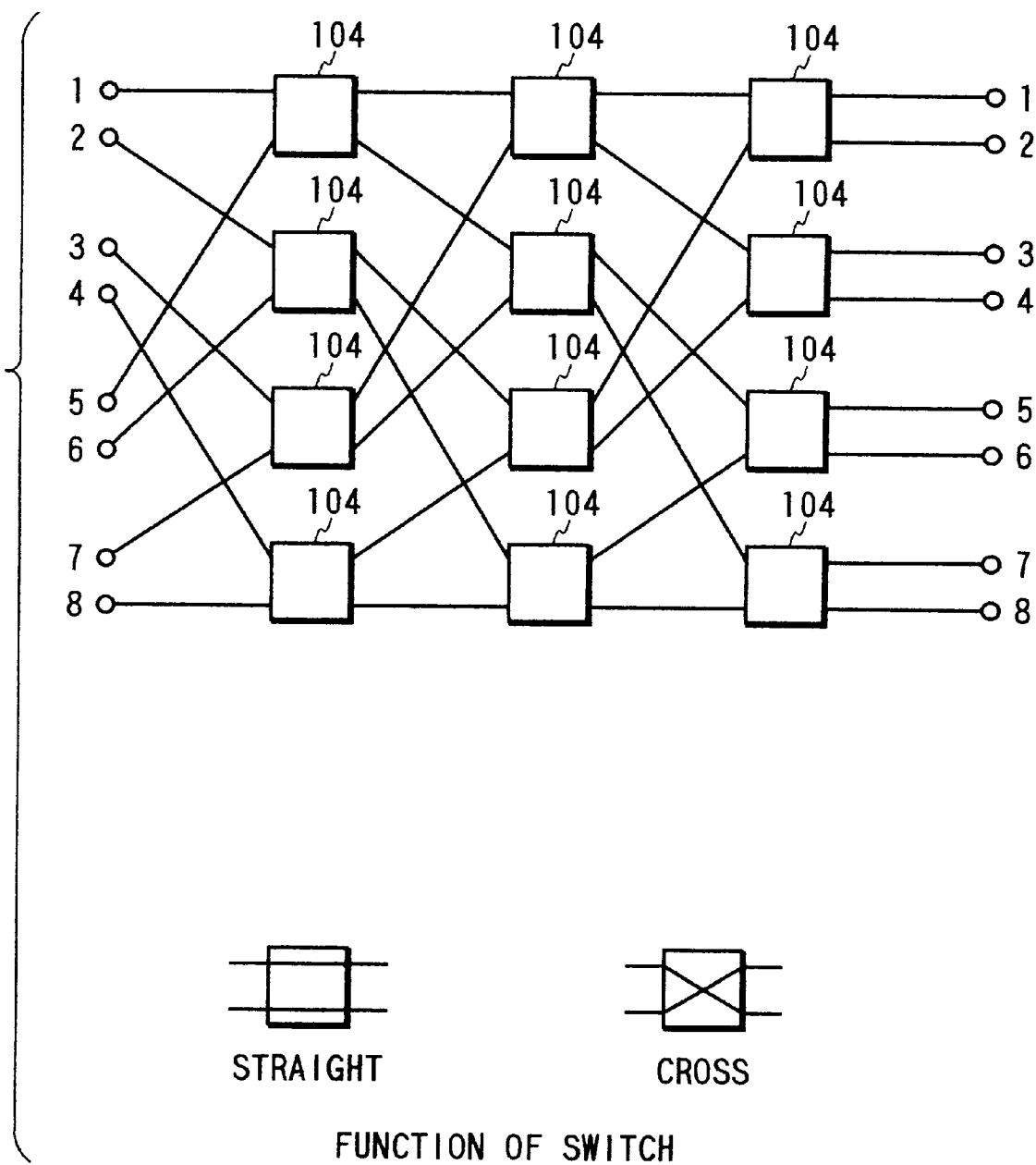
FIG. 16 is a block diagram of another 8×8 electric switch illustrating a prior art network exchanger.
Figure 17:
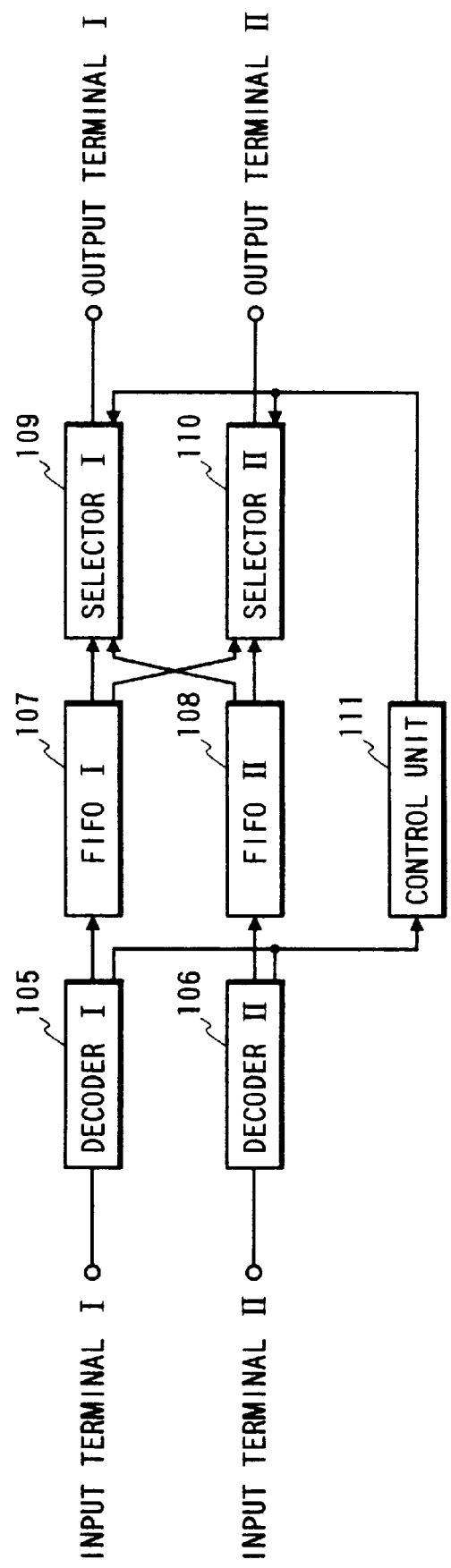
FIG. 17 is a block diagram of a 2×2 electric switch illustrating a prior art network exchanger.
Figure 18:
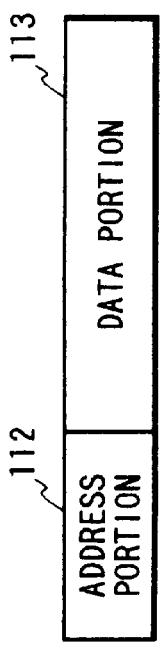
FIG. 18 is a diagram showing the structure of a packet used in the prior art network.
Figure 19:
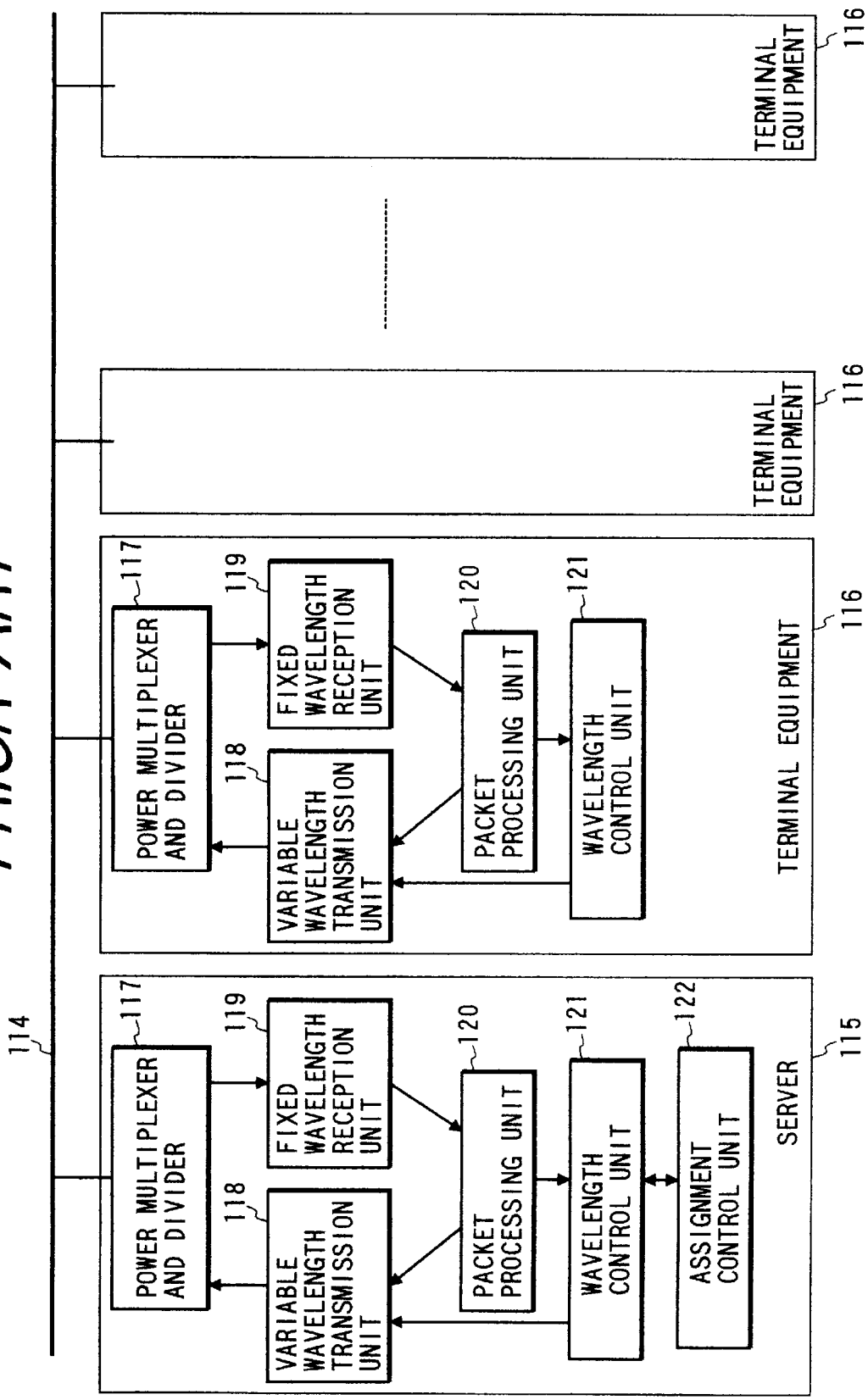
FIG. 19 is a block diagram of a network system illustrating a prior art.

FIG. 13 illustrates a time chart used in a second embodiment of the present invention. In this embodiment, the first transmission period Ts during which the transmitting node device transmits signals of wavelengths different from the wavelengths receivable by the plural fixed wavelength reception units contained in this node device, or a period for relaying and transmitting the packet between the node devices, is set four times longer than the second transmission period Tr during which the transmitting node device transmits signals of wavelengths equal to the wavelengths receivable by the fixed wavelength reception units contained in this transmitting node device, or a relaying and transmission period within this transmitting node device.

In FIG. 13, the operation period Ts is composed of four periods of Ts1, Ts2, Ts3 and Ts4, similarly to the first embodiment. One Tr period is provided following this operation period Ts. During the periods of Tr1, Tr2, Tr3 and Tr4, the transmission wavelength of the variable wavelength transmission unit is altered in due order. Each of the operation periods Ts and Tr is composed of the dual port memory reading period Td and the FIFO reading period Tf, similarly to the first embodiment. In this embodiment, the packet transmission is conducted in the same manner as in the first embodiment.

In this embodiment, since the relaying and transmission period of the packet is set four times longer than the relaying period within the same node device, transmission delay time can be reduced when plural packets are relayed and transmitted between the node devices.

In the above embodiments, the number of wavelengths to be received in the transmitting node device itself is four, but this number is not limited to four. Further, the number of groups of wavelengths receivable in the transmitting node device itself and wavelengths unable to be received by this node device is set to be two, but this may be more than two. In this case, the wavelength control pattern is divided into plural groups, and the transmission wavelengths of the variable wavelength transmission units are controlled during the operation periods with timings of such plural groups. Thus, the concept of the present invention can be embodied.

(Third Embodiment)

In the structure illustrated in FIG. 1, the filter 3 is located upstream of the multiplexer I 2 to intercept signals at unneeded wavelengths out of signals from the upstream node device, but the filter 3 can be positioned downstream of the power divider I 1. In this case, the filter 3 acts to intercept the wavelengths receivable by the fixed wavelengths reception units of this source node device.

Further, in the structure of FIG. 1, the combination of optical power divider and wavelength filter is used to select signals at desired wavelengths from the wavelength multiplexed signals, or to intercept signals at unneeded wavelengths. In place thereof, a demultiplexer for discriminating signals regarding their output ports on the basis of their wavelengths can be used to perform an equivalent function of the above combination. When the demultiplexer is used in place of the divider I 1 and the reception wavelength is output to the reception unit side of this node device while the other wavelengths are output to the downstream node device, the filter 3 can be removed. Moreover, when a demultiplexer is used in place of the divider II 7, the filter in the fixed wavelength reception unit is unnecessary.

Furthermore, a plurality of channels are established by the wavelength division multiplexing in the above-described embodiments, but the multiplexing way is not limited to the optical wavelength multiplexing. In the case of an electrical signal, frequency multiplexing or the like can be employed.

(Fourth Embodiment)

Figure 22B:
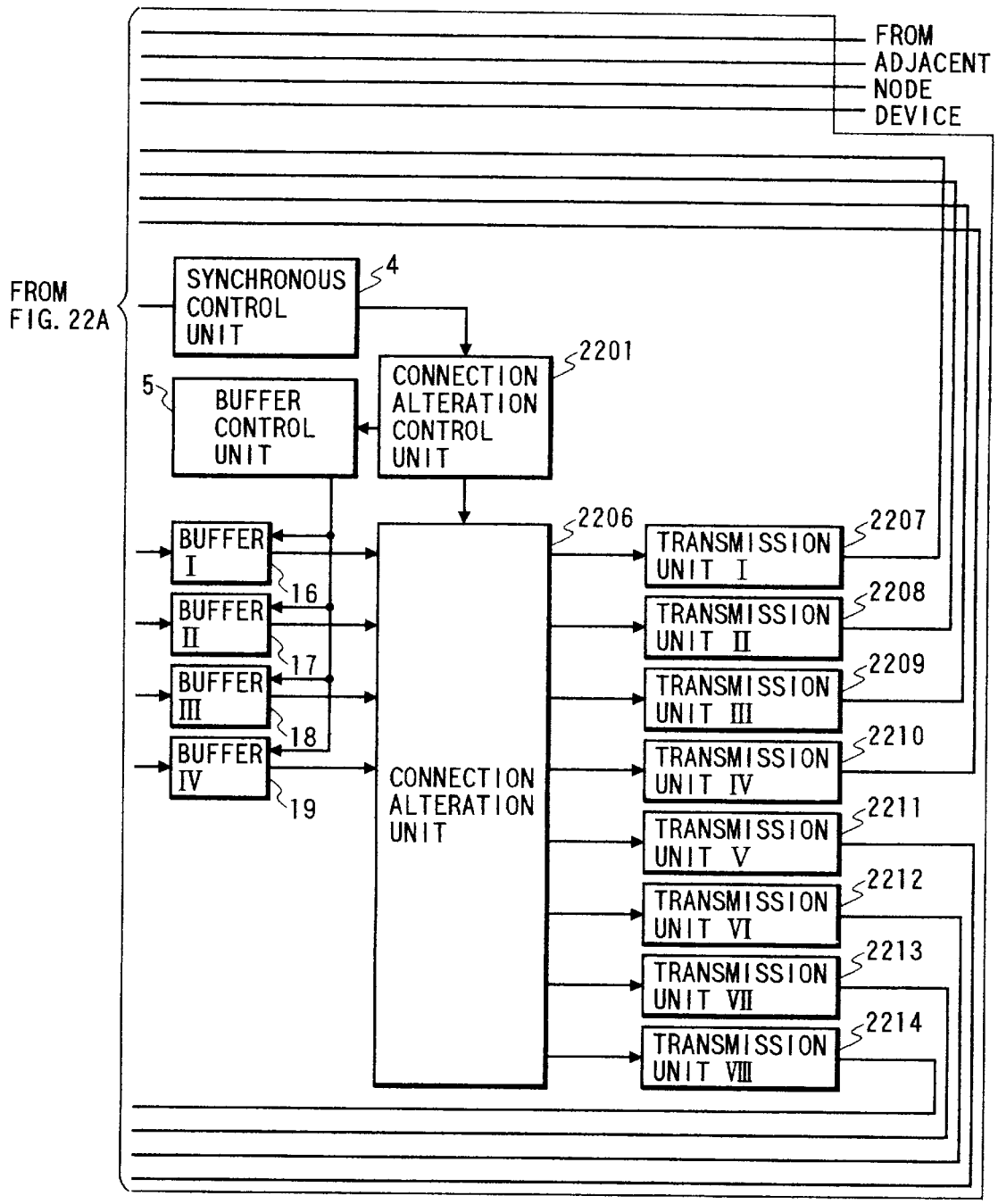
FIG. 22 is composed of FIGS. 22A and 22B showing block diagrams of a node device illustrating a fourth embodiment according to the present invention.
Figure 23:
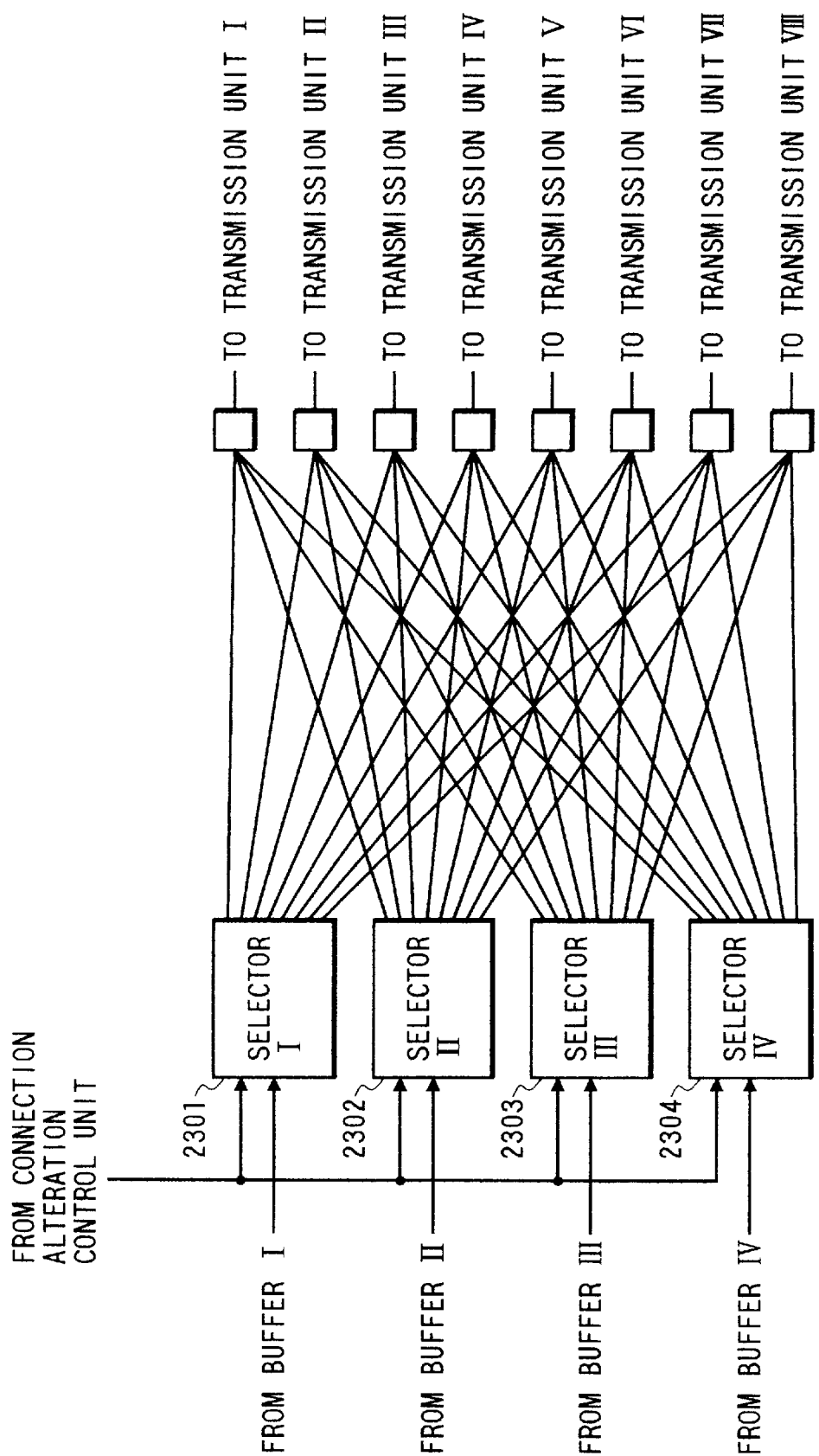
FIG. 23 is a block diagram of a connection alteration unit illustrating the fourth embodiment according to the present invention.

Although the plural channels in the above embodiments are established using the wavelength multiplexing, plural channels can be constructed using separate transmission lines. FIGS. 22A and 22B illustrate a structural example of a node device to be used in this case. In FIGS. 22A and 22B, devices common to those in FIG. 1 are denoted by the same numerals. Numerals 2202 to 2205 designate reception units I to IV which respectively receive signals transmitted on the separate and independent transmission lines or channels which are to be received by separate reception units. Structures of those reception units can be identical with each other because it is unnecessary for each reception unit to pick out a desired channel from the multiplexed channels. Each reception unit is provided with a photodetector for receiving an optical signal. Since signals on two transmission lines are input into each reception unit, a power multiplexer or the like may be disposed if necessary. Numerals 2207 to 2214 denote transmission units I to VIII which respectively have laser devices, which can be modulated, for performing optical transmission between transmission units and reception units in this embodiment. In contrast with the first embodiment, wavelengths output by those transmission units are not subjected to alteration for changing the transmission channel. In this embodiment, the transmission line itself, to which each transmission unit outputs the signal, serves as a channel. In this embodiment, means for altering a channel, to which each buffer outputs a signal, is a connection alteration unit 2206. The connection alteration unit 2206 alters the connection relationship between buffers I 16 to IV 19 and transmission units I 2207 to VIII 2214 under the control of a connection alteration control unit 2201, which corresponds to the wavelength control unit 6 in FIG. 1, in such a manner that the channel, to which each buffer outputs the signal, is altered in a predetermined sequence and that plural buffers do not contemporaneously output signals to a common channel (i.e., they respectively output the signals to different channels, contemporaneously). FIG. 23 illustrates the structure of the connection alteration unit. Selectors I 2301 to IV 2304 respectively receive signals from the buffers I to IV, and their output terminals to be selected by those selectors are decided under the control of the connection alteration control unit. The connection alteration control unit 2201 has the same function as that of the wavelength control unit 6 in FIG. 1, and has connection alteration control tables I to IV indicated in Table 4, in place of the wavelength control tables I to IV of the wavelength control unit 6. Those selectors in the connection alteration unit are controlled in accordance with those control tables I to IV.

TABLE 4

| table name | address | | | | | | | |
|---|---|---|---|---|---|---|---|---|
| | 0 | 1 | 2 | 3 | 4 | 5 | 6 | 7 |
| connection alteration control table I | I | II | III | IV | V | VI | VII | VIII |
| connection alteration control table II | IV | I | II | III | VIII | V | VI | VII |
| connection alteration control table III | III | IV | I | II | VII | VIII | V | VI |
| connection alteration control table IV | II | III | IV | I | VI | VII | VIII | V |

In Table 4, "I" indicates that the selector selects the transmission unit I, and also for the rest, Roman numerals in the table 4 correspond to Roman numerals of respective transmission units. This structure performs an operation equivalent to that of the first embodiment. The transmission line, to which the transmission unit I outputs the signal, is a channel (referred to as channel I) corresponding to $\lambda s1$ in the first embodiment, the transmission line, to which the transmission unit II outputs the signal, is a channel (referred to as channel II) corresponding to $\lambda s2$ in the first embodiment, the transmission line, to which the transmission unit III outputs the signal, is a channel (referred to as channel III) corresponding to $\lambda s3$ in the first embodiment, the transmission line, to which the transmission unit IV outputs the signal, is a channel (referred to as channel IV) corresponding to $\lambda s4$ in the first embodiment, the transmission line, to which the transmission unit V outputs the signal, is a channel (referred to as channel V) corresponding to $\lambda r1$ in the first embodiment, the transmission line, to which the transmission unit VI outputs the signal, is a channel (referred to as channel VI) corresponding to $\lambda r2$ in the first embodiment, the transmission line, to which the transmission unit VII outputs the signal, is a channel (referred to as channel VII) corresponding to $\lambda r3$ in the first embodiment, and the transmission line, to which the transmission unit VIII outputs the signal, is a channel (referred to as channel VIII) corresponding to $\lambda r4$ in the first embodiment.

Also in this embodiment, this source node device is synchronized with another node device by the synchronous control unit 4. That is, timing of alteration of channels, to which the connection alteration unit of another node device inputting signals into this node device outputs signals, is appropriately synchronized with timing of alteration of channels to which the connection alteration unit of this node device outputs signals, so that channels I to IV, into which another node device inputs signals, are not input into the respective reception units I to IV contemporaneously with channels V to VIII into which the transmission units V to VIII of this node device input signals. Specifically, the structures of this node device and a node device adjacent to this node device on the upstream side are made the same as that illustrated in FIG. 22, this adjacent node device uses the same connection alteration control tables as this node device uses, and the access to the control tables is performed with the same timing in both of this node device and the adjacent node device. In this structure, two transmission lines are connected to each reception unit, but channels are discriminated from each other, depending on by which reception unit each channel is received, in this embodiment. Therefore, it is important in this embodiment that two transmission lines input into each reception unit are treated as a common channel and that signals are not input from the two transmission lines, which are connected to the same reception unit, contemporaneously.

Also in this embodiment, similar to the first embodiment, channels, to which the buffers are connected, are sequentially altered, and the respective buffers output signals, which are to be output to the channels connected to the buffers, when the buffers are respectively connected to the channels. Thus, signals can be output from the plural buffers without any arbitration control.

The above-discussed structure can perform an operation fully identical with that of the first embodiment, and devices, such as multiplexers and power dividers, can be dispensed with.

Also in this embodiment, channels I to IV, which are channels directed to another node device, can be multiplexed by some means, so that the configuration of transmission lines between the node devices can be readily established. Specifically, when optical transmission is performed as in this embodiment, a ribbon fiber is used, or transmission wavelengths of the transmission units I to IV are differentiated from each other to achieve the wavelength multiplexing.

Further, although the optical transmission is performed and signals are output to the respective channels through the transmission units, which convert electric signals from output terminals of the connection alteration unit to optical signals, appropriate transmission drivers can be used instead when transmission is conducted using electric signals. Furthermore, when the transmission is conducted using electric signals and no signal conversion is needed for the transmission between the node devices, outputs from the output terminals of the connection alteration unit can be directly supplied to the separation (insertion) units in this node device and another node device.

As described in the foregoing, in the network system of the present invention, the channel from the connection means is guided to the separation unit in a node device in which this connection means is contained. Therefore, communication between terminal equipments connected to this node device can be performed, without increasing the number of inputs into the connection means, by inputting a signal, which is input from the terminal equipment connected to this node device through the insertion means, into the separation unit of this node device through the connection means.

Further, channels, to which respective buffers can output signals, are sequentially altered in the connection means, and each buffer outputs a signal, which is to be output on a predetermined channel, when this buffer can output the signal to the predetermined channel. Hence, no arbitration control is needed. Since the sequence of the alteration can be appropriately set, a ratio between time periods, during which each buffer can output to the channel directed to the separation unit of this node device and during which each buffer can output to the channel directed to another node device, can be desirably set. Thus, transmission capacity can be effectively utilized.

What is claimed is:

1. A network system comprising:
    a plurality of node devices, said node devices being connected with each other to transmit a signal therebetween, each connectable to a sub-transmission line and each including,
    a plurality of buffers for temporarily storing a signal to be transmitted;
    connection means for selecting a channel, to which the signal from each said buffer is to be output, from a plurality of channels in such a manner that said plurality of buffers are contemporaneously connected to the different channels, respectively;
    a separation unit for receiving the signal to be transmitted along a part of the plurality of channels and outputting said signal to the sub-transmission line to which said node device is connected; and
    an insertion unit for inputting a signal from the sub-transmission line, to which said node device is connected, into said buffer.

2. A network system according to claim 1, wherein a signal from another node device is input into said separation unit as well, and wherein said node device further includes a synchronous control unit for controlling said connection means such that said buffer does not output the signal to be transmitted along the part of the plurality of channels during a time period the signal from said another node device is inputting into said separation unit.

3. A network system according to claim 1, wherein a channel other than the part of the plurality of channels is connected to another node device.

4. A network system according to claim 1, wherein numbers of said separation units and the part of the plurality of channels are respectively plural and equal to each other and different channels of the part of the plurality of channels are respectively connected to said separation units.

5. A network system according to claim 1, wherein a signal from another node device is input into said separation unit, and wherein numbers of said separation units and said buffers are respectively plural and equal to each other, said separation units are respectively connected to said buffers, and a signal, which is not to be output from said separation unit to said sub-transmission line, is input into said buffer to which said separation unit is connected.

6. A network system according to claim 1, wherein said connection means sequentially alters the channels, to which said buffers respectively output signals, in a predetermined sequence, and a signal of signals stored in said buffer, which is to be output to a predetermined channel, is output from said buffer when said buffer is connected to said predetermined channel.

7. A network system according to claim 1, wherein the plurality of channels are channels which are respectively discriminated from each other by optical wavelengths.

8. A network system according to claim 1, wherein the plurality of channels are respectively different transmission lines.

9. A network system according to claim 1, wherein said connection means includes a plurality of variable channel transmission means which are provided corresponding to said plurality of buffers, respectively, and a channel, to which said buffer is connected, is selected by altering an output channel of said variable channel transmission means.

10. A network system according to claim 9, wherein said node device includes means for taking out the part of the plurality of channels from outputs of said plurality of variable channel transmission means and outputting the taken-out channel to said separation unit.

11. A network system according to claim 9, wherein said node device includes means for inputting the outputs of said plurality of variable channel transmission means and a signal input from another node device into a common transmission line and means for taking out the part of the plurality of channels from said common transmission line and outputting the taken-out channel to said separation unit.

12. A network system according to claim 1, wherein said connection means includes connection alteration means for connecting inputs from said plurality of buffers to the plurality of channels.

13. A network system according to claim 1, wherein a channel other than the part of the plurality of channels is to be output to another node device, the part of the plurality of channels in a first node device is common to a channel other than the part of the plurality of channels in a second node device which is a node device for inputting a signal into said first node device, and a channel other than the part of the plurality of channels in said first node device is common to the part of the plurality of channels in a third node device which is a node device to which said first node device outputs a signal.

14. A network system according to claim 13, wherein said connection means in said mutually-adjacent node devices are synchronously controlled and a common channel is not selected contemporaneously.

15. A network system according to claim 1, wherein said connection means sequentially alters the channels, to which said plurality of buffers output signals, respectively, in a predetermined sequence, and said predetermined sequence includes a first transmission period, during which said connection means connects said respective buffers to the part of the plurality of channels, and a second transmission period during which said connection means connects said respective buffers to a channel other than the part of the plurality of channels.

16. A network system according to claim 15, wherein said predetermined sequence is weighted such that one of said first and second transmission periods is longer than the other period.

17. A network system according to claim 1, wherein the signal to be transmitted is a packet with address information.

18. A node device for use in a network system in which a plurality of node devices are connected with each other to transmit a signal therebetween, and a sub-transmission line is connectable to said node device, said node device comprising:
    a plurality of buffers for temporarily storing a signal to be transmitted;
    connection means for selecting a channel, to which the signal from each said buffer is to be output, from a plurality of channels in such a manner that said plurality of buffers are contemporaneously connected to the different channels, respectively;
    a separation unit for receiving the signal to be transmitted along a part of the plurality of channels and outputting said signal to the sub-transmission line to which said node device is connected; and an insertion unit for inputting a signal from the sub-transmission line, to which said node device is connected, into said buffer.

19. A node device according to claim 18, wherein a signal from another node device is input into said separation unit as well, and wherein said node device further includes a synchronous control unit for controlling said connection means such that said buffer does not output the signal to be transmitted along said part of the plurality of channels during a time period the signal from said another node device is inputting into said separation unit.

20. A node device according to claim 18, wherein a channel other than said part of the plurality of channels is output to another node device.

21. A node device according to claim 18, wherein numbers of said separation units and said part of the plurality of channels are plural and equal to each other, and different channels of said part of the plurality of channels are respectively connected to said plurality of separation units.

22. A node device according to claim 18, wherein a signal from another node device is input into said separation unit, and wherein numbers of said separation units and said buffers are plural and equal to each other, said separation units are respectively connected to said buffers, and a signal, which is not to be output from said separation unit to said sub-transmission line, is input into said buffer to which said separation unit is connected.

23. A node device according to claim 18, wherein said connection means sequentially alters the channels, to which said plurality of buffers respectively output the signals, in a predetermined sequence, and a signal of the signals stored in said buffer, which is to be output to a predetermined channel, is output from said buffer when said buffer is connected to said predetermined channel.

24. A node device according to claim 18, wherein said plurality of channels are channels which are respectively discriminated from each other by optical wavelengths.

25. A node device according to claim 18, wherein said plurality of channels are respectively different transmission lines.

26. A node device according to claim 18, wherein said connection means includes a plurality of variable channel transmission means which are provided corresponding to said plurality of buffers, respectively, and a channel, to which said buffer is to be connected, is selected by altering an output channel of said variable channel transmission means.

27. A node device according to claim 26, further comprising means for taking out said part of the plurality of channels from outputs of said plurality of variable channel transmission means and outputting the taken-out channel to said separation unit.

28. A node device according to claim 26, further comprising means for inputting the outputs of said plurality of variable channel transmission means and a signal input from another node device into a common transmission line and means for taking out said part of the plurality of channels from said transmission line and outputting the taken-out channel to said separation unit.

29. A node device according to claim 18, further comprising connection alteration means for connecting inputs from said plurality of buffers to said plurality of channels, respectively.

30. A node device according to claim 18, wherein a channel other than said part of the plurality of channels is to be output to another node device, said part of the plurality of channels in said node device is common to a channel other than said part of the plurality of channels in another node device which inputs a signal into said node device and is adjacent to said node device on an upstream side, and a channel other than said part of the plurality of channels in said node device is common to said part of the plurality of channels in another node device to which said node device outputs a signal and which is adjacent to said node device on a downstream side.

31. A node device according to claim 30, wherein said connection means in said node device and said adjacent node devices are synchronously controlled and a common channel is not selected contemporaneously.

32. A node device according to claim 18, wherein said connection means sequentially alters the channels, to which said plurality of buffers output signals, respectively, in a predetermined sequence, and said predetermined sequence includes a first transmission period, during which said connection means connects said respective buffers to said part of the plurality of channels, and a second transmission period during which said connection means connect said respective buffers to a channel other than said part of the plurality of channels.

33. A node device according to claim 32, wherein said predetermined sequence is weighted such that one of said first and second transmission periods is longer than the other period.

34. A node device according to claim 18, wherein the signal to be transmitted is a packet with address information.

35. A communication method for use in a network system in which a plurality of node devices are connected with each other to transmit a signal therebetween and a sub-transmission line is connected to the node device, and in which the node device includes a plurality of buffers for temporarily storing a signal to be transmitted, connection means for selecting a channel, to which the signal from each buffer is to be output, from a plurality of channels in such a manner that the plurality of buffers are contemporaneously connected to the different channels, respectively, a separation unit for receiving the signal to be transmitted along a part of the plurality of channels and outputting the signal to the sub-transmission line to which this node device is connected, and an insertion unit for inputting a signal from the sub-transmission line, to which this node device is connected, into the buffer, said communication method comprising:

a step of outputting a signal, which is to be output to the sub-transmission line of this node device, out of the signals stored in the buffer, from the buffer, when the buffer is connected to the part of the plurality of channels received by the separation unit to which the sub-transmission line is connected.

36. A communication method according to claim 35, wherein the node device outputs a channel other than the part of the plurality of channels to another node device, and the buffer outputs a signal, which is to be output to another node device, out of the signals stored in the buffer, when the buffer is connected to the channel other than the part of the plurality of channels.

37. A communication method according to claim 36, wherein when the signal to be output to another node device is a signal to be output to the sub-transmission line of another node device adjacent to this node device on a downstream side of a transmission direction, the buffer outputs the signal when the buffer is connected to a channel received by the separation unit in the adjacent node device, to which the sub-transmission line is connected.

38. A communication method according to claim 36, wherein the plurality of node devices are synchronously controlled, and the buffer is controlled such that the buffer does not output to the part of the plurality of channels when the signal from another node device is input into the separation unit.

* * * * *

UNITED STATES PATENT AND TRADEMARK OFFICE
CERTIFICATE OF CORRECTION

PATENT NO.    : 5,930,014
DATED         : July 27, 1999
INVENTOR(S)   : MITSURU YAMAMOTO It is certified that error appears in the above-identified patent and that said Letters Patent is hereby corrected as shown below:

COLUMN 1

Line 12, "equipment" should be deleted.

COLUMN 2

Line 66, "unit" should read --unit 91--.

COLUMN 3

Line 7, "unit" should read --unit 91--; and
    Line 22, "functions;" should read --functions,--.

COLUMN 4

Line 58, "an" should read --a--.

COLUMN 5

Line 58, "output" should read --outputs--.

COLUMN 7

Line 44, "objects," should read --above objects,--.

UNITED STATES PATENT AND TRADEMARK OFFICE
CERTIFICATE OF CORRECTION

PATENT NO. : 5,930,014

DATED : July 27, 1999

INVENTOR(S) : MITSURU YAMAMOTO

It is certified that error appears in the above-identified patent and that said Letters Patent is hereby corrected as shown below:

COLUMN 9

Line 60, "an other" should read --another--.

COLUMN 11

Figure 20B:
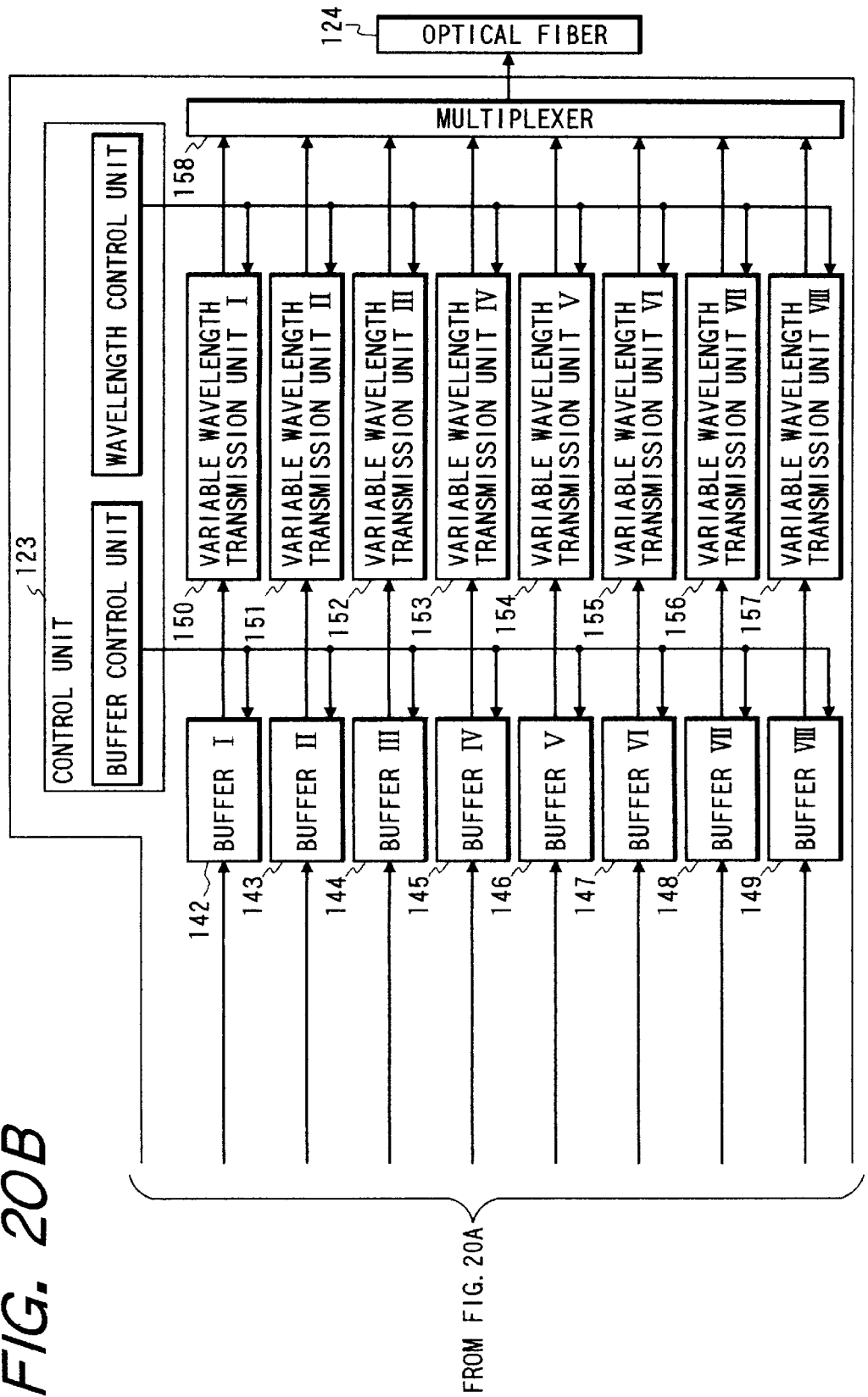
Figure 21:
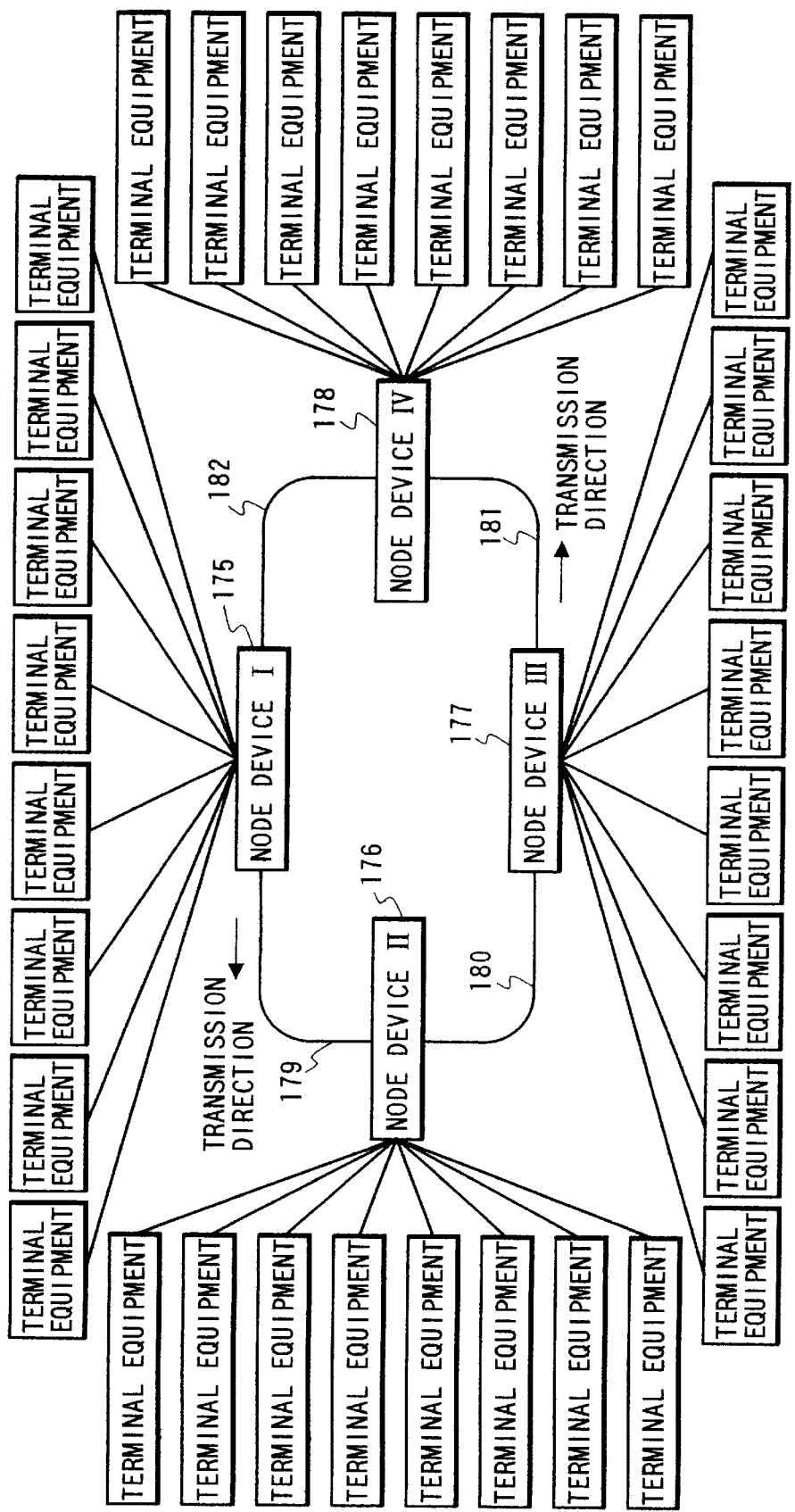
FIG. 21 is a block diagram of the structure of a network system of the previous U.S. application.

Line 56, "FIGS. 20A-20B" should read --FIG. 20--; and
Line 58, "application." should read --application;--.

COLUMN 15

Line 1, "packet" should read --packet is--; and
Line 19, "is" should read --are--.

COLUMN 16

Line 60, "Those eight tables" should read --Those eight values--; and
Line 63, "(TLDS)" should read --(TLDs)--.

COLUMN 17

Line 33, "cases;" should read --cases:--.

UNITED STATES PATENT AND TRADEMARK OFFICE
CERTIFICATE OF CORRECTION

PATENT NO.    : 5,930,014
DATED         : July 27, 1999
INVENTOR(S)   : MITSURU YAMAMOTO It is certified that error appears in the above-identified patent and that said Letters Patent is hereby corrected as shown below:

COLUMN 19

Line 5, "IV 63" should read --IV 62--.

COLUMN 22

Line 19, "filer 3" should read --filter 3--; and
    Line 33, "the its" should read --its--.

COLUMN 23

Line 48, "buffer I" should read --buffers I--.

COLUMN 25

Line 12, "FIFOS" should read --FIFOs--.

COLUMN 29

Line 20, "including," should read --including:--.

COLUMN 30

Line 19, "taken- out" should read --taken-out--.

UNITED STATES PATENT AND TRADEMARK OFFICE
CERTIFICATE OF CORRECTION

PATENT NO.    : 5,930,014
DATED         : July 27, 1999
INVENTOR(S)   : MITSURU YAMAMOTO It is certified that error appears in the above-identified patent and that said Letters Patent is hereby corrected as shown below:

<u>COLUMN 32</u>

Line 16, "connect" should read --connects--.

Signed and Sealed this

Third Day of April, 2001

*Attest:*

NICHOLAS P. GODICI

*Attesting Officer*    Acting Director of the United States Patent and Trademark Office